(12) United States Patent
Baumann

(10) Patent No.: US 8,196,277 B2
(45) Date of Patent: Jun. 12, 2012

(54) MACHINE TOOL

(75) Inventor: Ulrich Baumann, Lenningen (DE)

(73) Assignee: Traub Drehmaschinen GmbH & Co. KG, Reichenbach (DE)

( * ) Notice: Subject to any disclaimer, the term of this patent is extended or adjusted under 35 U.S.C. 154(b) by 0 days.

(21) Appl. No.: 13/050,756

(22) Filed: Mar. 17, 2011

(65) Prior Publication Data

US 2011/0162182 A1    Jul. 7, 2011

Related U.S. Application Data

(63) Continuation of application No. PCT/EP2009/061756, filed on Sep. 10, 2009.

(30) Foreign Application Priority Data

Sep. 22, 2008   (DE) .................. 10 2008 050 656

(51) Int. Cl.
*B23P 23/00*     (2006.01)
*B23B 3/30*      (2006.01)

(52) U.S. Cl. ............. 29/27 R; 29/37 R; 29/37 A; 29/36; 82/120; 82/129

(58) Field of Classification Search .................. 29/27 R, 29/27 C, 36, 37 R, 37 A, 50, 54; 82/129, 82/120, 121; *B23B 3/30*
See application file for complete search history.

(56) References Cited

U.S. PATENT DOCUMENTS

| | | | |
|---|---|---|---|
| 5,787,560 A * | 8/1998 | Schalles | 29/36 |
| 7,313,850 B2 * | 1/2008 | Miller | 29/37 A |
| 2003/0019336 A1 | 1/2003 | Baumann | |
| 2004/0211301 A1 * | 10/2004 | Kobayashi et al. | 82/129 |

FOREIGN PATENT DOCUMENTS

| | | | |
|---|---|---|---|
| DE | 3626324 A1 * | 2/1988 | |
| DE | 19621406 A1 | 12/1997 | |
| DE | 10130760 A1 | 1/2003 | |
| DE | 60303672 T2 | 10/2006 | |
| EP | 1 321 212 A1 | 6/2003 | |
| EP | 1 388 384 A1 | 2/2004 | |
| EP | 1485231 A2 | 12/2004 | |
| WO | WO-2010/031732 A1 * | 3/2010 | |

OTHER PUBLICATIONS

Machine Translation of DE 19621406-A1, which DE '406 was published Dec. 1997.*

* cited by examiner

*Primary Examiner* — Erica E Cadugan
(74) *Attorney, Agent, or Firm* — Reinhart Boerner Van Deuren P.C.

(57) ABSTRACT

In order to improve a machine tool comprising a first spindle for accommodating a workpiece and a first carrier for machining units movable along an X axis, which can be moved relative to one another along a Z axis, a second carrier which is movable along an X axis and with which machining units can be moved into or out of a functional position associated with the first spindle in a transverse direction extending transversely to the X axis and transversely to the Z axis, as well as an additional carrier for machining units in such a manner that it offers optimum possibilities for the machining of a front side of a workpiece and a rear side of a workpiece, it is suggested that the second carrier bear a second spindle, that as a result of movement of the second carrier the second spindle be movable in the direction of the Z axis and the transverse direction between a workpiece takeover position and at least one workpiece machining position and that the additional machining units be arranged in a spatial area, in which machining of a rear side of a workpiece can be carried out with the second spindle located in the workpiece machining position.

35 Claims, 20 Drawing Sheets

– 1 –

MACHINE TOOL

CROSS-REFERENCE TO RELATED PATENT APPLICATIONS

This application is a continuation of international application number PCT/EP2009/061756 filed on Sep. 10, 2009.

This patent application is a continuation of International application No. PCT/EP2009/061756 of Sep. 10, 2009, which claims the benefit of German application No. 10 2008 050 656.7 of Sep. 22, 2008, the teachings and disclosure of which are hereby incorporated in their entirety by reference thereto.

BACKGROUND OF THE INVENTION

The invention relates to a machine tool comprising a machine frame, a first spindle arranged on the machine frame for accommodating a workpiece, a first carrier for first machining units which is arranged on the machine frame and can be moved relative to the machine frame in the direction of a first X axis transverse to a first spindle axis, wherein the first spindle and the first carrier can be moved relative to one another in the direction of a Z axis parallel to the first spindle axis, a second carrier for second machining units which is arranged on the machine frame, can be moved relative to the machine frame at least in the direction of a second X axis transverse to the first spindle axis and with which, in addition, varying second machining units can be moved into or out of a functional position associated with the workpiece in the main spindle in a transverse direction extending transversely to the second X axis and transversely to the Z axis, as well as an additional carrier for additional machining units which is arranged on the machine frame.

In the known solutions, a tool turret is, for example, associated with the workpiece held in the first spindle on each of its oppositely located sides so that machining can be carried out on oppositely located sides of the workpiece with each of these tool turrets.

Furthermore, an additional carrier is provided for further machining

The object underlying the invention is to improve a machine tool of the generic type in such manner that it offers optimum possibilities for the machining of workpieces on a front side of the workpiece and a rear side of the workpiece with a compact and inexpensive construction.

SUMMARY OF THE INVENTION

This object is accomplished in accordance with the invention, in a machine tool of the type described at the outset, in that the second carrier bears a second spindle as one of the second machining units, that as a result of movement of the second carrier the second spindle can be moved in the direction of the Z axis and the transverse direction between a workpiece takeover position aligned with the first spindle and at least one workpiece machining position and that the additional machining units are arranged in a spatial area, in which machining of a rear side of the workpiece held in the second spindle can be carried out with the second spindle located in the at least one workpiece machining position.

The advantage of the solution according to the invention is to be seen in the fact that as a result of the arrangement of the second spindle on the second carrier the possibility is created of likewise moving it by way of the movements of the second carrier which are provided in any case for the machining of the workpiece held in the first spindle and, therefore, of using these axes of movement which are already present for machining the workpiece as well, in particular machining the rear side of the workpiece, so that despite a compact and inexpensive construction essentially all the possibilities for the machining of a workpiece on the front side of the workpiece in the case of a workpiece accommodated in the first spindle and on the rear side of the workpiece in the case of a workpiece accommodated in the second spindle are available.

Machining units within the meaning of the invention comprise the second spindle and tool units and/or possibly support units, as well. A functional position of the second carrier is any position thereof, in which the workpiece held in the first spindle can be taken over or machined or supported.

With respect to the arrangement of the spatial area for the additional machining units, no further details have so far been given.

One particularly favorable solution provides, for example, for the spatial area for the additional machining units to be located on a side of a geometric plane which is located opposite the first carrier, this plane extending through the first spindle axis and transversely to the second X axis.

The spatial area is preferably arranged at a distance from the geometric plane.

Furthermore, it is favorable for the accessibility to the spatial area with the additional machining units when the spatial area is arranged on one side of a first plane of machining which extends through the first spindle axis as well as parallel to the second X axis.

In this respect, the spatial area is preferably located on a side of the first plane of machining which faces a front side of the machine tool.

With respect to the arrangement of the spatial area, it is, in addition, favorable when the spatial area is arranged on a side of the second carrier which does not face the first spindle axis.

For example, it is conceivable to arrange the spatial area on a side of the second carrier which faces away from the first spindle axis.

With respect to the arrangement of the additional machining units, no further details have so far been given.

The additional machining units can, for example, be arranged without any defined pattern or in a defined pattern.

One advantageous solution provides for the additional machining units to be arranged along at least one line.

Such a line could, for example, be a straight line.

In this respect, the straight line can extend either parallel to the geometric plane which extends through the first spindle axis and transversely to the second X axis or transversely to this geometric plane, in particular parallel to the X axis.

Another advantageous solution provides for the at least one line to be curved.

It is, in particular, preferably provided for the at least one line to be curved in an arc shape around a center point.

This solution is advantageous, in particular, when the second carrier has a turret head which can rotate about a turret axis so that, as a result of rotation of the turret head about the turret axis when the turret axis coincides with the center point of the line curved in an arc shape, a changeover from one machining unit to another is possible.

In order to avoid collisions, the center point of the line curved in an arc shape is arranged at a distance from the first plane of machining so that the machining units, for example, can be organized as a result such that they are at a greater distance from the first plane of machining than from the center point.

Such a curved line, in particular curved in an arc shape, is advantageously arranged such that this line extends over a greater distance in the direction of the second X axis than in the direction of the transverse direction which runs, for example, parallel to the second Y axis.

Furthermore, it is advantageous for the solution according to the invention when the additional machining units are arranged outside a spatial area of movement of machining units which are arranged on the second carrier and designed as second tool units when the second carrier is in a functional position.

In this respect, the spatial area of movement is to be defined as the spatial area which borders on the second carrier, is required by the tool units and in which the second tool units move during use of the second tool units of the second carrier on the workpiece accommodated in the first spindle.

The risk of collision between the second tool units of the second carrier and tool units of the additional carrier may be prevented, in particular, alternatively or in addition to the possibilities specified above in that the workpiece accommodated in the second spindle and projecting beyond it is arranged outside a tool space associated with the second carrier.

In this respect, the tool space is the space above the second carrier, in which the tool units of the second carrier extend with their tools.

The workpiece projecting beyond the second spindle may be positioned outside the tool space in various directions.

One solution provides for the workpiece to be arranged outside the tool space with its machining side in a direction transverse to the Z axis.

Another advantageous solution provides for the workpiece to be arranged outside the tool space with its machining side in the direction of the Z axis.

For example, it is conceivable with this solution for the second spindle to be arranged relative to a second carrier designed as a turret head such that an end side of the second spindle is arranged in the direction of the second spindle axis at a radial distance from receptacles for the tool units or at an axial distance from a central plane of receptacles for the tool units which is greater than a maximum extension of tools of the second tool units in a direction parallel to the second spindle axis.

If the second carrier is provided with a linear unit, the second spindle is, for example, arranged with the second spindle axis such that the side of a workpiece, which is to be machined and is accommodated in this spindle, is located outside a tool space, in which the tools of the tool units extend.

With respect to the arrangement of the second spindle relative to the second carrier, no further details have so far been given.

One advantageous solution, for example, provides for the second spindle to be arranged relative to the second tool units such that during machining of the workpiece accommodated in the second spindle the second tool units can be moved in a collision free manner relative to the additional tool units.

This solution has the great advantage that, as a result, the position of the second tool units in relation to the additional tool units need not be taken into consideration during the control of the machine tool for the machining of the workpiece accommodated in the second spindle.

In the case where a simultaneous machining of the workpiece arranged in the main spindle with a tool unit of the second carrier and of the workpiece held in the second spindle on the second carrier with tool units of the additional carrier is intended to be carried out, it is preferably provided for the spatial area for the additional machining units to comprise an additional spatial area, in which only machining units for the simultaneous machining are provided, wherein this spatial area is preferably arranged at a distance in relation to the main spindle axis.

In this respect, it is favorable, in particular, when the spatial area accommodating the additional machining units for the simultaneous machining is arranged such that during machining of the workpiece accommodated in the second spindle with these machining units second machining units arranged on the second carrier can be used on the workpiece held in the first spindle.

A further, advantageous solution provides for the spatial area for the additional machining units to comprise a spatial area, in which only machining units for the machining of the rear side are provided.

This spatial area creates the possibility of carrying out only axial movements of the second carrier which relate to the machining of the rear side of the workpiece and are, therefore, completely independent of the machining of the front side of the workpiece.

In addition, it is advantageous when the spatial area accommodating the additional machining units for the machining purely of the rear side are arranged such that during machining of the workpiece accommodated in the second spindle with the additional machining units in this spatial area the tool units of the second carrier can be moved in a collision free manner in relation to the workpiece in the first spindle.

For the most efficient possible machining of the workpiece with the second spindle, it is, in addition, preferably provided for at least one second tool unit, which is provided for the simultaneous machining and arranged on the second carrier, to be associated with the second spindle provided on the second carrier.

Such a second tool unit is preferably arranged at a distance relative to the second spindle.

With respect to the design of the second carrier, no definitive details have been given in conjunction with the preceding explanations concerning the individual embodiments.

It is, for example, conceivable for the second carrier to comprise a turret unit, on the turret head of which the second spindle is arranged.

In this respect, the second spindle could be mountable on the turret head in the same way as a tool unit.

One advantageous solution provides, however, for the second spindle to be held on the turret head by means of a pivot arm in order to achieve a stable arrangement of the second spindle relative to the turret head.

The pivot arm could be mounted for rotation about the turret axis independently of the turret head.

In this respect, the turret head is preferably connected non-rotatably to the pivot arm so that the pivot arm is always rotatable about the turret axis together with the turret head.

In this embodiment, the second spindle axis is preferably arranged at a radial distance from the turret axis which is greater than a maximum radial extension of tools of the second tool units in order to avoid any collisions between various units.

In the case of a turret head as second carrier for the accommodation of the tool units, the spatial area of movement is determined by the tool unit which has the greatest radial extension in relation to the second turret axis and, therefore, is determined by an annular space around the second turret axis, wherein, in addition, a movement of the second turret axis at least in the direction of the X axis extends the annular space likewise in the direction of the X axis and wherein the movement comprises at least that distance, by which the second carrier must be movable in the direction of the X axis in order to be able to reach the workpiece in the first spindle with the machining units of the second carrier.

In a further embodiment, in which the second carrier comprises a turret head, on which the second spindle is arranged, it is provided for the second spindle to be arranged relative to the turret head such that an end side of the second spindle is arranged in the direction of the second spindle axis at a distance from a central plane of receptacles for the second machining units which is greater than a maximum extension of tools of the second tool units in the direction of the second spindle axis.

Alternatively thereto, it is provided in such a machine tool for the second spindle to be arranged with the second spindle axis such that a side to be machined of a workpiece accommodated in this spindle is arranged outside a tool space which extends around the turret head and in which the tool units and the tools extend.

In the case of a turret head as second carrier, which is rotatable about the second turret axis, the second tool unit for the simultaneous machining is arranged on the second carrier at an angular distance from the second spindle, wherein the angular distance is more then 60°, preferably more than 70°.

One advantageous range of the angular distance amounts to less then 120°, preferably less than 110°.

In the case of a turret head for accommodating the counter spindle and the tool units, which is comprised by the second carrier, it is provided for the third spatial area to have an angular distance from the first spindle axis, in relation to the turret axis, which corresponds essentially to the angular distance of the tool unit provided for the simultaneous machining from the second spindle.

In the case of a linear unit as second carrier, it is preferably provided for the second spindle to be arranged at a distance from a row direction, in the area of which cutting edges of the second tool units are located.

In the case of a linear unit, it is, furthermore, expediently provided for the distance of the spatial area for the additional machining units for the simultaneous machining from the first spindle axis to correspond approximately to a distance of the second spindle from the row direction, along which cutting edges of the tools are located.

Additional features and advantages of the invention are the subject matter of the following description as well as the drawings illustrating several embodiments.

DETAILED DESCRIPTION OF THE INVENTION

Figure 1:
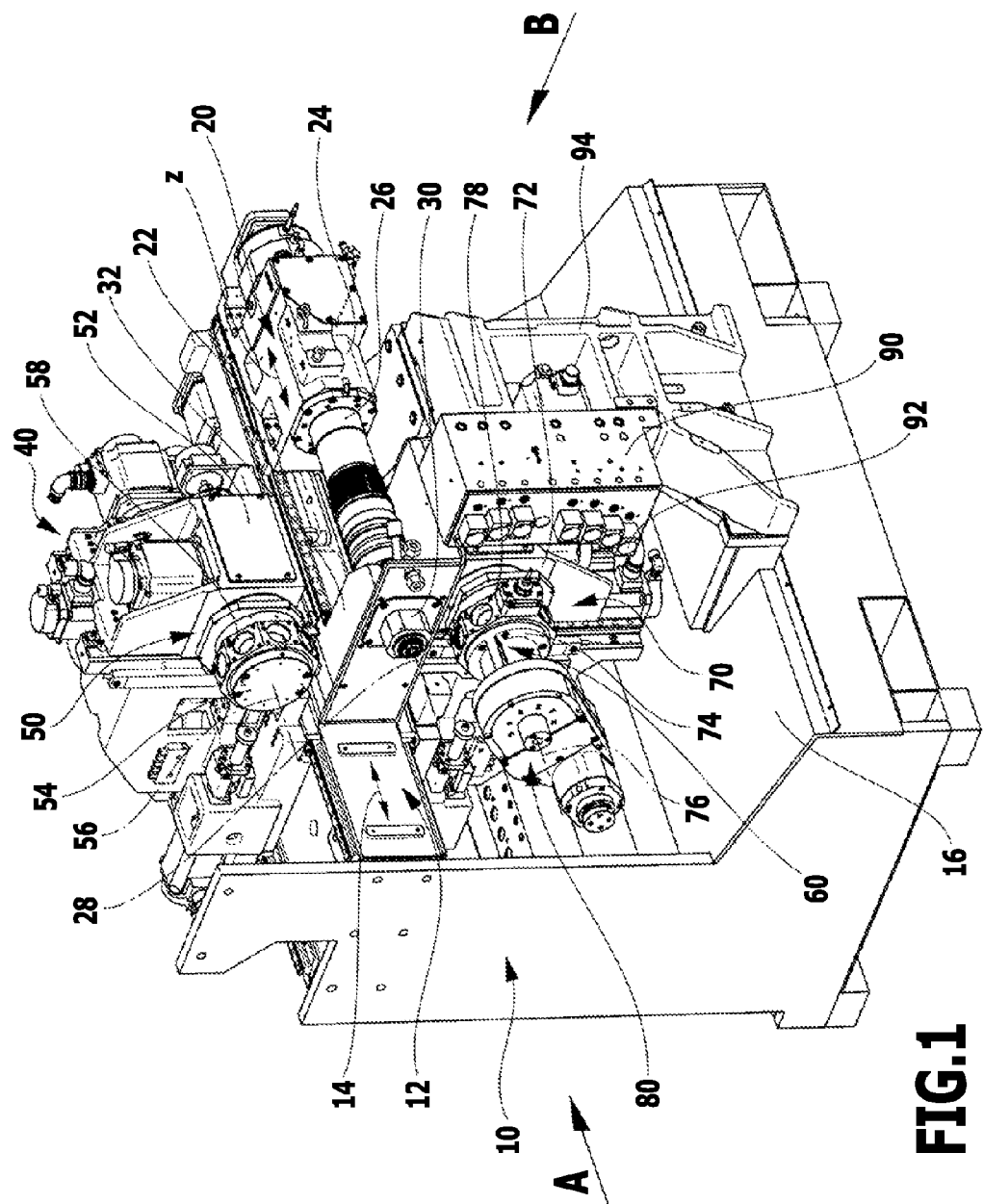
FIG. 1 shows a perspective view of a first embodiment of a machine tool.

A first embodiment of a machine tool according to the invention, illustrated in FIG. 1, comprises a machine frame 10 which has a machine bed member 12 which extends in a longitudinal direction 14.

Figure 2:
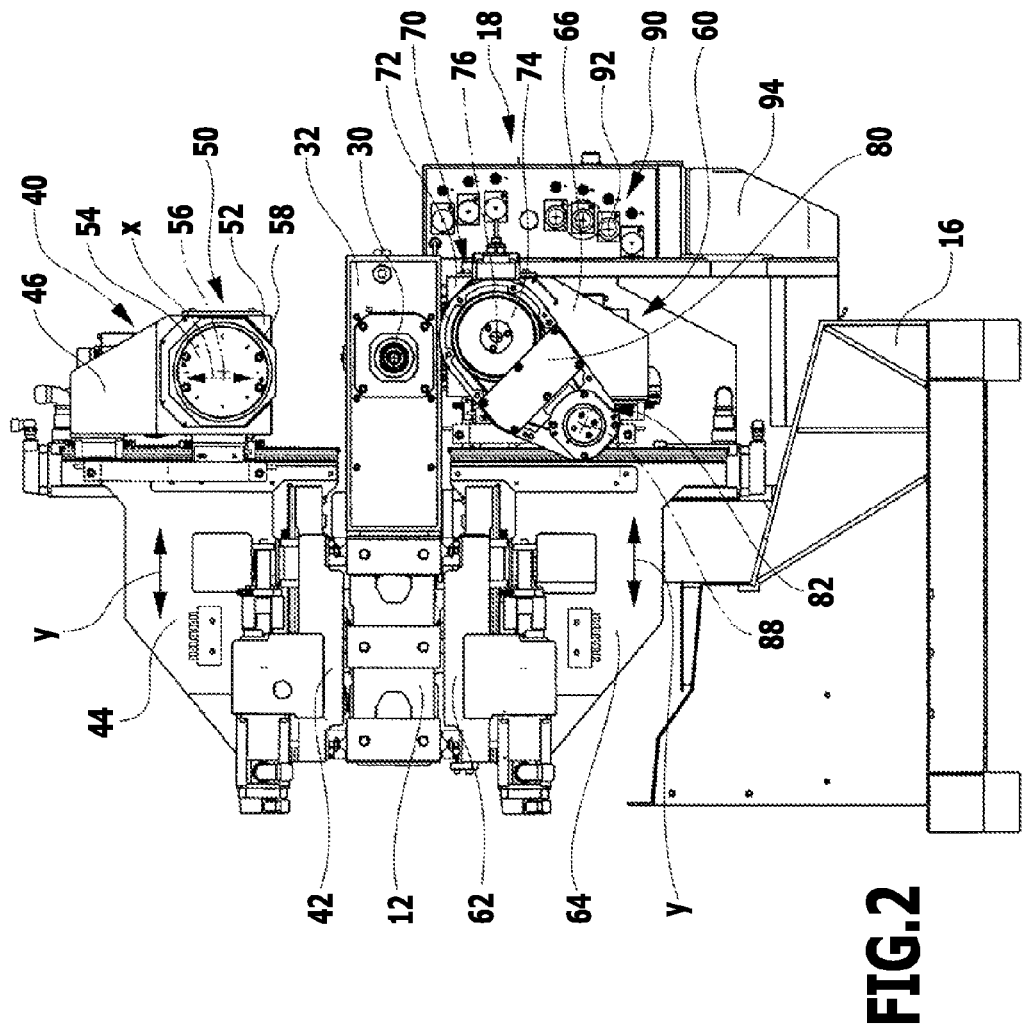
FIG. 2 shows a plan view in the direction of arrow A in FIG. 1.
Figure 3:
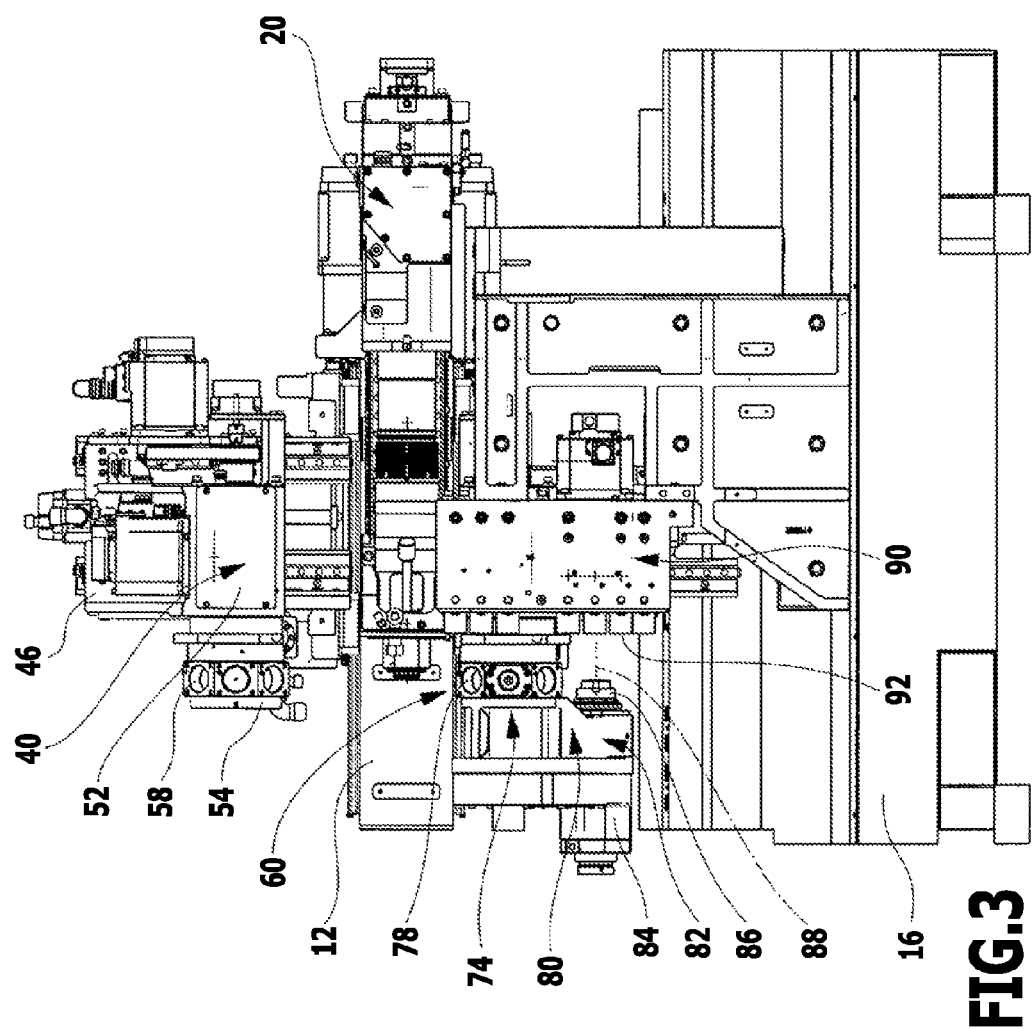
FIG. 3 shows a plan view in the direction of arrow B in FIG. 1.

As illustrated in FIGS. 1 and 2, a main spindle unit 20 is provided on the machine bed member as first spindle unit which is guided by means of guides 22 so as to be displaceable on the machine bed member 12, namely such that the main spindle unit 20 can be moved in the direction of a Z axis parallel to the longitudinal direction 14 of the machine bed member 12.

The main spindle unit 20 comprises, for its part, a main spindle housing 24, in which a main spindle 26 is mounted as first spindle so as to be rotatable and drivable about a main spindle axis 28 as first spindle axis, wherein the main spindle axis 28 extends parallel to the Z axis, along which the main spindle unit 20 can be moved.

In the embodiments illustrated, the machine tool is designed as a machine for longitudinal turning which therefore has a guide bushing 30 for longitudinal turning which is associated with the main spindle unit 20, is held on an arm 32 connected securely to the machine bed member 12 and serves the purpose of guiding a workpiece accommodated in the main spindle 26 for machining, wherein the guide bushing 30 for longitudinal turning represents a guide for the workpiece which is stationary relative to the machine frame 10 in the direction of the Z axis whereas the main spindle unit 20 and, therefore, the workpiece, as well, can be moved in the direction of the Z axis.

A first carrier for machining units, which is designated as a whole as 40, is arranged on the machine bed member 12 and comprises a first Z slide 42 which can be moved on the machine bed member 12 in a direction parallel to the Z axis, a first Y slide 44 which can be moved on the first Z slide 42 in the direction of a Y axis and a first X slide 46 which is guided on the first Y slide 44 and can be moved in the direction of a first X axis.

A first turret unit for the machining units, which is designated as a whole as 50, is seated on the first X slide 46 and comprises a first turret housing 52 and a first turret head 54, wherein the first turret head 54 can be rotated about a first turret axis 56 relative to the first turret housing 52.

A plurality of receptacles 58 for machining units are provided on the first turret head 54.

The first turret head 54 can, for example, be rotated about the first turret axis 56 in a step-less controlled manner in order to be able to compensate for any positioning errors and/or geometry errors via the activation of the rotary positions.

Furthermore, a second carrier 60 for machining units is provided on the machine bed member 12, wherein the second carrier 60 likewise has a second Z slide 62 which is guided on the machine bed member 12 so as to be movable in the direction of the Z axis, a second Y slide which is guided on the second Z slide 62 so as to be displaceable in the direction of a Y axis and a second X slide 66 which is guided on the second Y slide so as to be movable in the direction of an X axis.

A second turret unit designated as a whole as 70 is arranged on the second X slide 66 and has a second turret housing 72, on which a second turret head 74 is arranged which can be rotated about a second turret axis 76 relative to the second turret housing 72.

The second turret head 74 likewise has receptacles 78 for machining units but, on the other hand, also bears a pivot arm 80, on which, as a machining unit, a counter spindle unit 82 is arranged as second spindle unit which, for its part, has a counter spindle housing 84 as well as a counter spindle 86 as second spindle unit which is rotatably mounted in the counter spindle housing 84, wherein the counter spindle 86 is rotatable about a counter spindle axis 88 as second spindle axis relative to the counter spindle housing 84 and the counter spindle axis 88 is preferably aligned parallel to the second turret axis 76.

Figure 4:
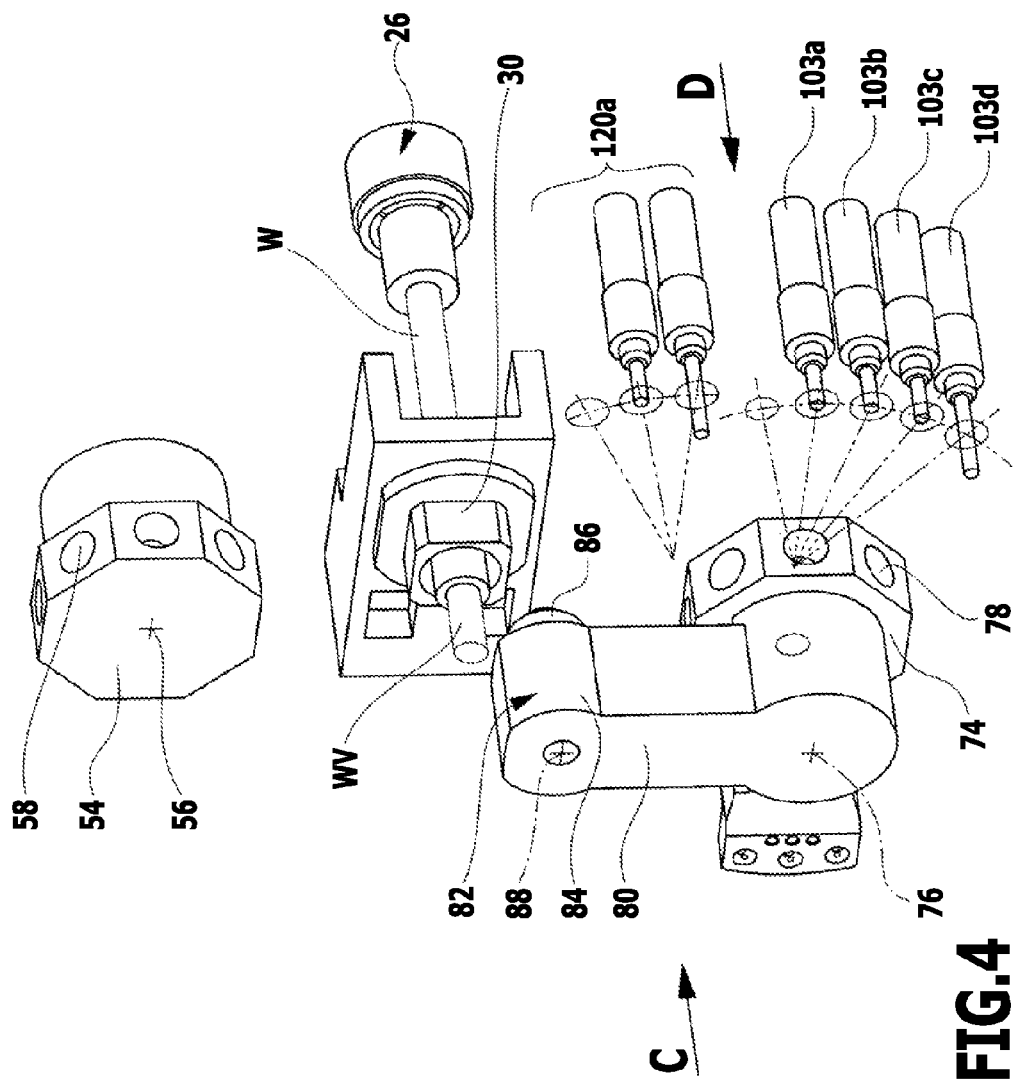
FIG. 4 shows a schematic illustration of a section of a first spindle of a first carrier and a second carrier with additional machining units.

The counter spindle 86 serves the purpose of taking up a workpiece W, which is held by the main spindle 26 and guided by the guide bushing 30 for longitudinal turning, with the machined front side WV of the workpiece following machining of the front side WV of the workpiece (FIG. 4) and machining it on the rear side.

For this purpose, a third carrier 90 is provided on the machine frame 10 and this has receptacles 92 for machining units, the receptacles 92 are provided stationarily on the third carrier 90 and the third carrier 90 is rigidly connected to the machine frame 10, for example to the foot part 16 thereof, by means of a holding arm 94.

Figure 5:
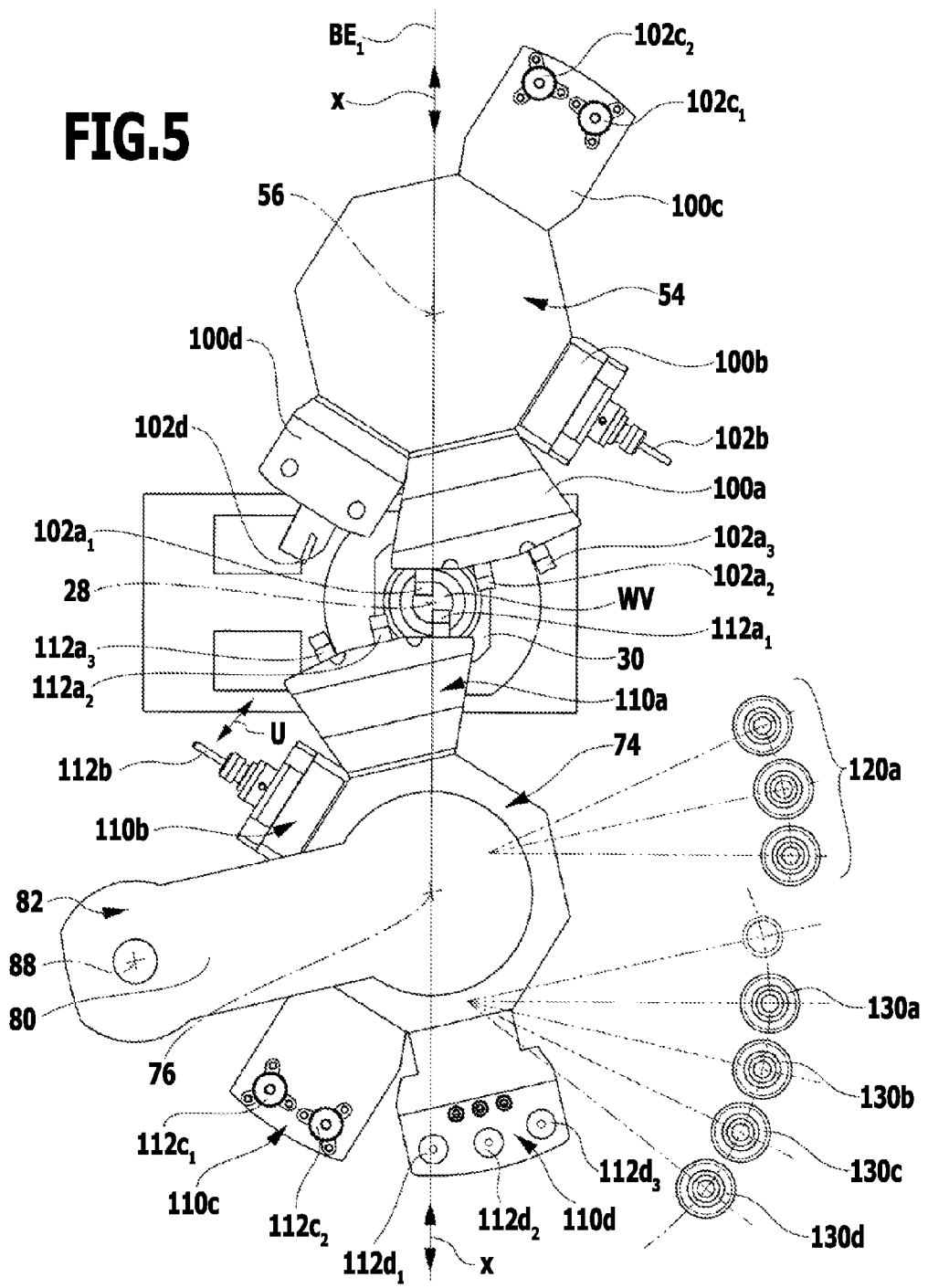
FIG. 5 shows a plan view in the direction of arrow C in FIG. 4 of a first carrier, a workpiece which is held by the first spindle and guided by the guide bushing for longitudinal turning and which is machined on a front side of the workpiece by a first carrier with a first tool and a second carrier with a second tool, wherein the second carrier is in a front side machining position.

Machining of the workpiece W on the front side WV of the workpiece takes place, as illustrated, for example, in FIG. 5, by way of first tool units 100a, 100b, 100c and 100d which represent machining units inserted into the first receptacles 58 of the first turret head 54 and the tools 102 of which can be used alternatingly.

For example, the tool $102a_1$ is, in the illustration according to FIG. 5, in its machining position in order to machine the front side WV of the workpiece.

For this purpose, as illustrated in FIG. 5, the turret head 54 is moved in the direction of the first X axis which is preferably located in a first plane of machining $BE_1$ which extends, on the one hand, through the turret axis 56 and, on the other hand, through the main spindle axis 28, as will be explained in greater detail in the following. Furthermore, it is possible as a result of rotation of the turret head 54 to bring either the remaining tools $102a_2$ or $102a_3$ of the tool unit 100a or other tools 102 of the other tool units 100 into a machining position, in which the respective tool 102 can machine the front side WV of the workpiece.

For example, an advancing movement of a tool is brought about for all the rotary machining, i.e., for example, in the case of the tools $102a_1$, $102a_2$ and $102a_3$ as well as $102d$, merely as a result of movement of the turret head 54 in the direction of the first X axis or the Z axis.

In the case of drilling tools or milling tools, such as, for example, the tools 102b or $102c_1$ or $102c_2$, an advancing movement is preferably brought about in the direction of the first X axis and the first Y axis or, where applicable, in addition or exclusively the first Z axis.

The second turret head 74 also bears second tool units 110 as machining units, for example the tool units 110a, 110b and 110c as well as the tool unit 110d which are equipped with tools 112.

All the tools 112 serve the purpose of, for example, machining the workpiece W accommodated in the main spindle 26 on the front side WV of the workpiece. As illustrated in FIG. 5, the tool $112a_1$ of the tool unit 110 is, for example, engaged on the front side WV of the workpiece.

In this front side machining position, a tool advancing movement for the tool $112a_1$ is brought about by way of movement of the second turret head 74 in the direction of the second X axis and/or the second Z axis.

In this respect, in the front side machining position the X axis extends parallel to the first plane of machining BE1 and is preferably located in the plane of machining BE1 when rotary machining is carried out and so the plane of machining BE1 also runs through the second turret axis 76 in the case of the embodiment illustrated.

Figure 6:
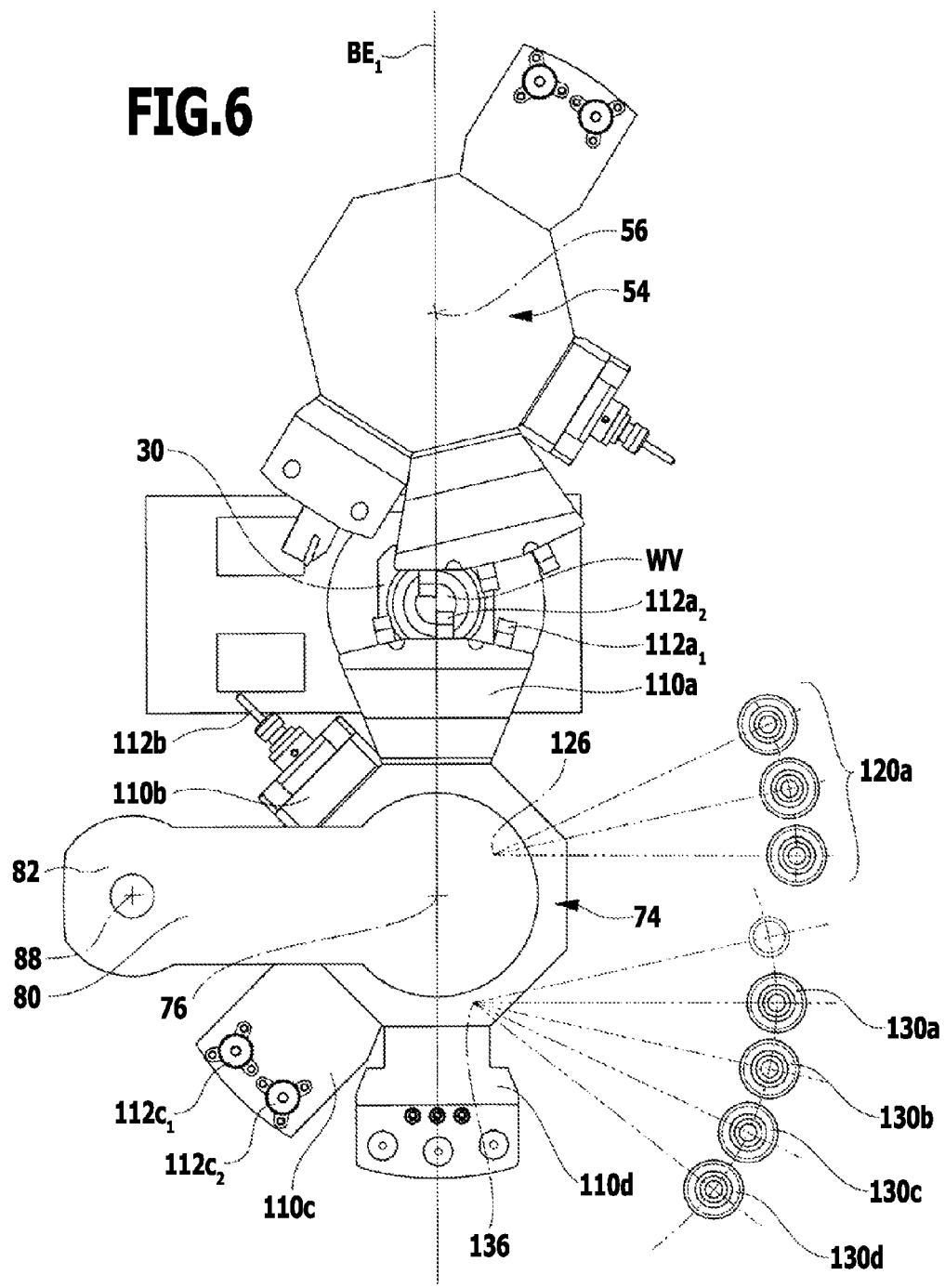
FIG. 6 shows an illustration similar to FIG. 5, wherein the second carrier brings a different second tool into use in the front side machining position.

As illustrated, for example, in FIG. 6, a changeover of the tool used for machining from the tool $112a_1$ to the tool $112a_2$ can take place as a result of rotation of the second turret head 74 about the second turret axis 76.

Figure 7:
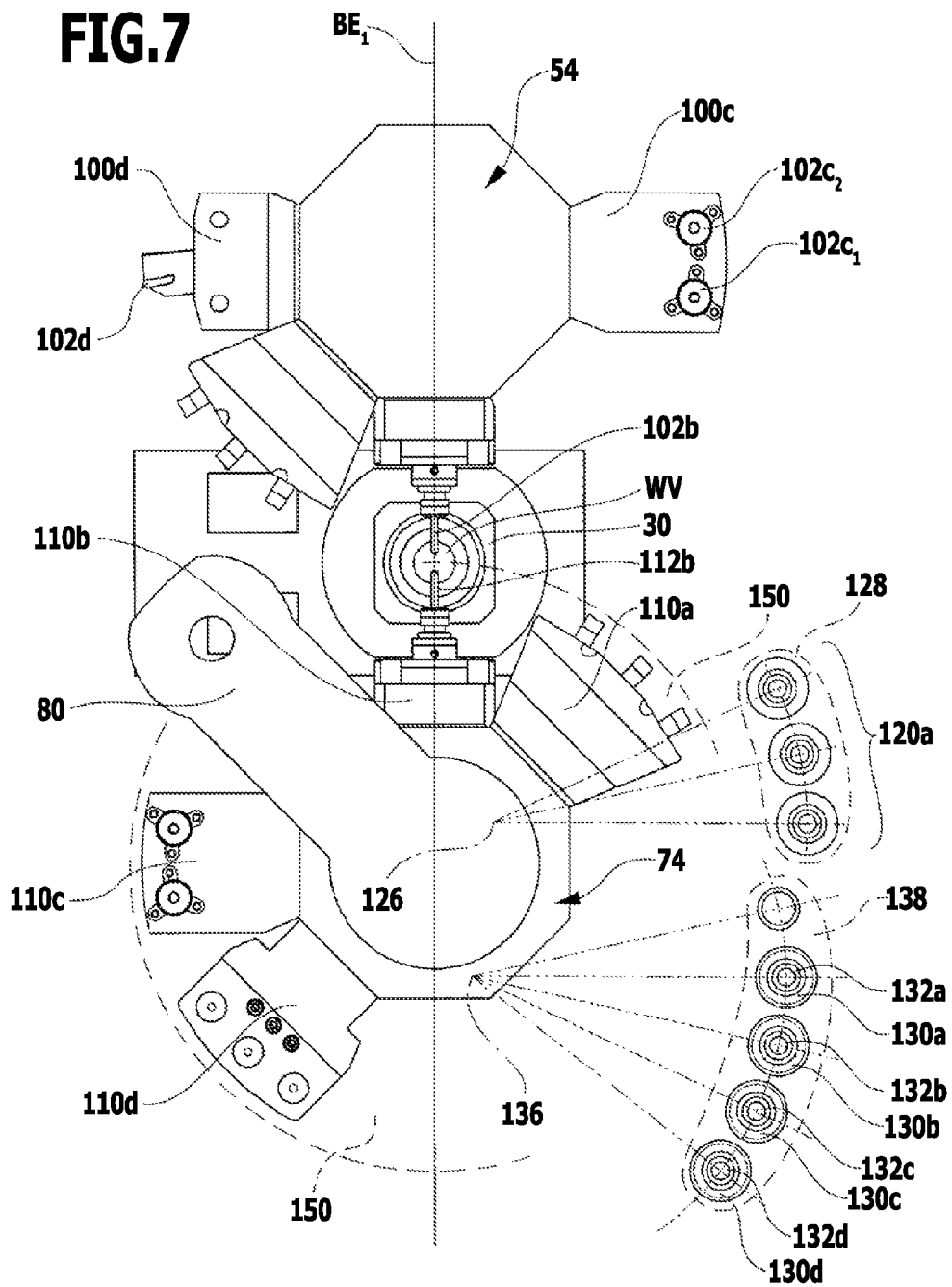
FIG. 7 shows an illustration similar to FIG. 5, wherein the first carrier and the second carrier each use a driven tool for the machining of the front side.

As illustrated, in addition, in FIG. 7, drill machining can also be carried out on the front side WV of the workpiece, for example, with the tools 102b and 112b as a result of suitable rotation of the turret heads 54 and 74, wherein the drilling tools 102b and 112b can be used with their axes, on the one hand, lying in the first plane of machining BE1 but also aligned parallel or at an angle thereto.

Figure 8:
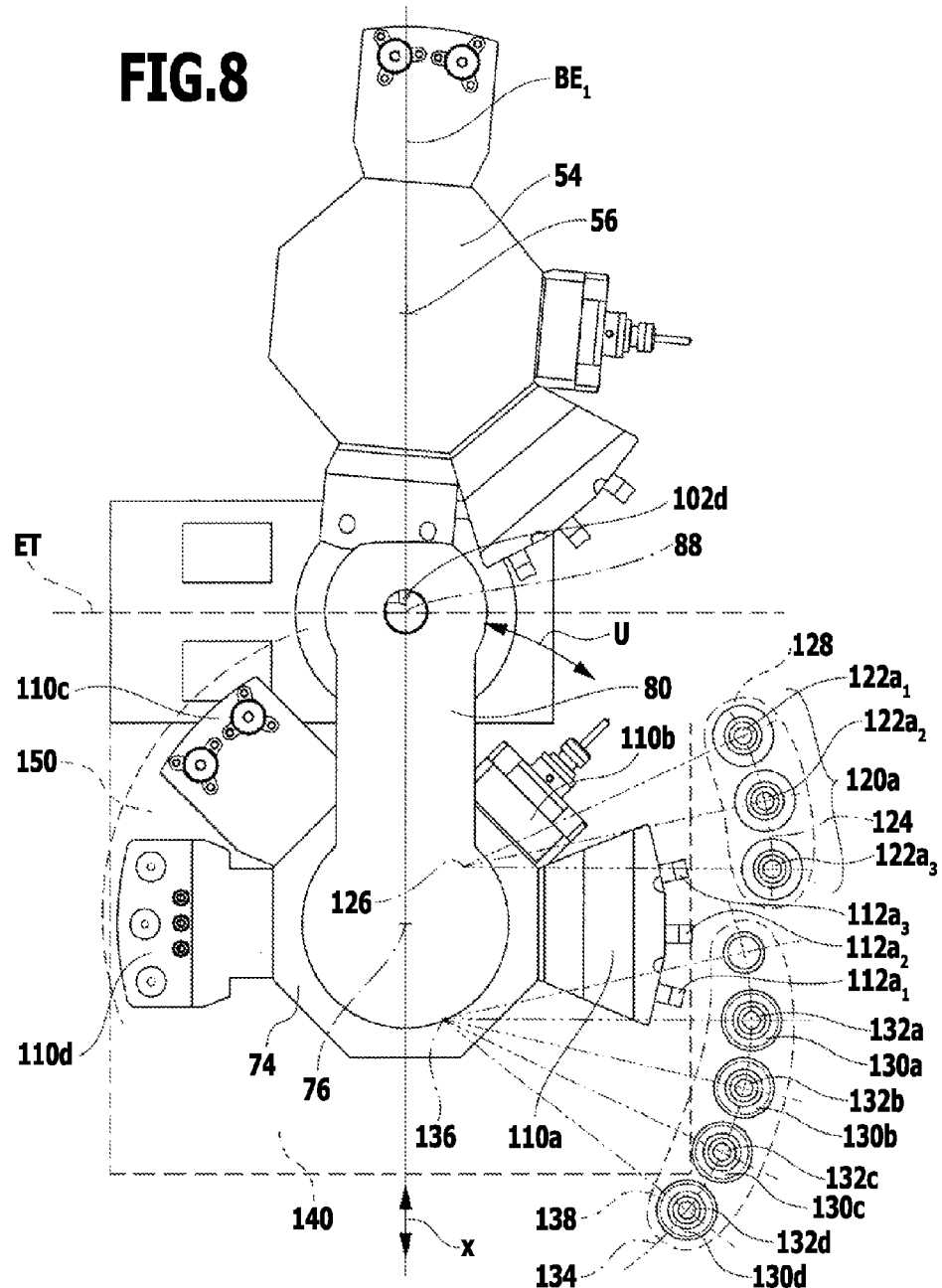
FIG. 8 shows an illustration similar to FIG. 5, wherein the second carrier is in a workpiece transfer position.

If the machining of the workpiece W on its front side WV is finished, the workpiece WV, which is, for example, a front area of a workpiece rod, will be cut off, as illustrated in FIG. 8, by means of the cutting tool 102d, wherein the front side WV of the workpiece has been taken up at the same time by the counter spindle 86 which is held on the pivot arm 80 and located in a takeover position and the counter spindle 86 co-rotates synchronously with the main spindle 26 about its counter spindle axis 88.

For this purpose, the pivot arm 80 is turned such that the counter spindle 86 is in its takeover position relative to the workpiece W held in the main spindle 26, wherein in the takeover position the counter spindle axis 88 is aligned coaxially to the main spindle axis 28.

Figure 9:
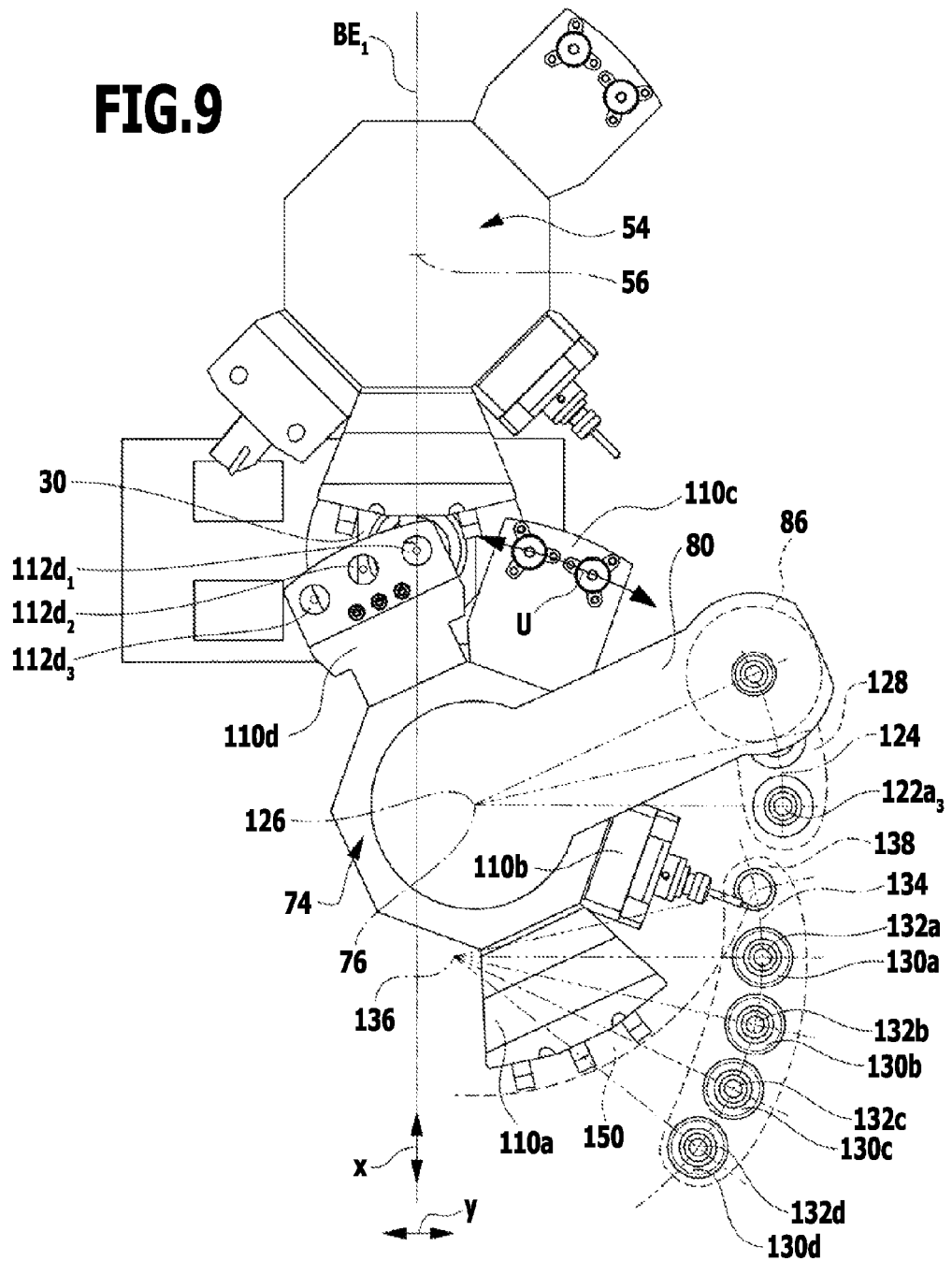
FIG. 9 shows an illustration similar to FIG. 5, wherein a front side of a workpiece is being machined with the first carrier, the second carrier is in a rear side simultaneous machining position and a workpiece held in a second spindle is being machined with a third machining unit and, at the same time, the workpiece held in the first spindle is being machined on the front side of the workpiece with a second machining unit held on the second carrier.

As illustrated in FIG. 9, a first type of rear side machining of the workpiece accommodated in the counter spindle 86 with the front side WV of the workpiece is possible due to the fact that the second turret head 76 is pivoted about the second turret axis 76 and, as a result, the counter spindle 86 is already moved in a transverse direction U transverse to the second X axis. Furthermore, the second turret head 76 is moved at the same time in the direction of the X axis and the Y axis such that the second turret axis 76 is located to the side of the first plane of machining $BE_1$ and is thereby displaced in the direction of the X axis and the Y axis into a simultaneous rear side machining position such that, on the one hand, the tool $112d_1$ of the tool unit 100d can be used on the next workpiece held in the main spindle 26 and guided by the guide bushing 30 for longitudinal turning on its front side WV and, on the other hand, the workpiece accommodated in the counter spindle 86 can be machined at the same time with a third tool unit 120a.

In the third tool unit 120a, the tools $122a_1$, $122a_2$ and $122a_3$ are arranged along a line 124 which extends as an arced segment around a first center point 126 of the line which the second turret axis 76 passes through when the second turret head 74 is in the simultaneous rear side machining position illustrated in FIG. 9.

Figure 10:
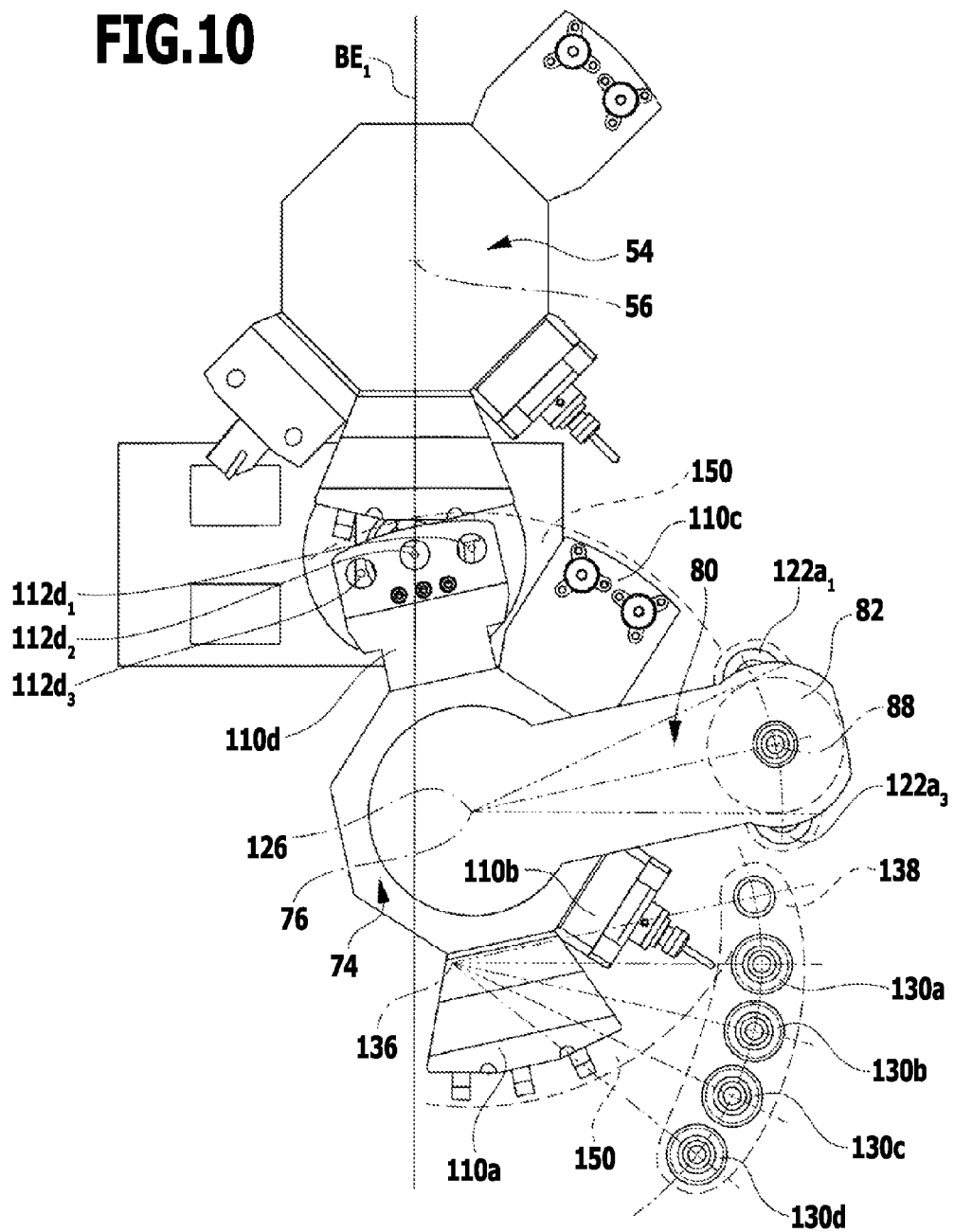
FIG. 10 shows an illustration similar to FIG. 9, wherein an additional tool of the third machining unit is used for the simultaneous machining of the rear side and an additional tool of the second machining unit is used on the front side of the workpiece.
Figure 11:
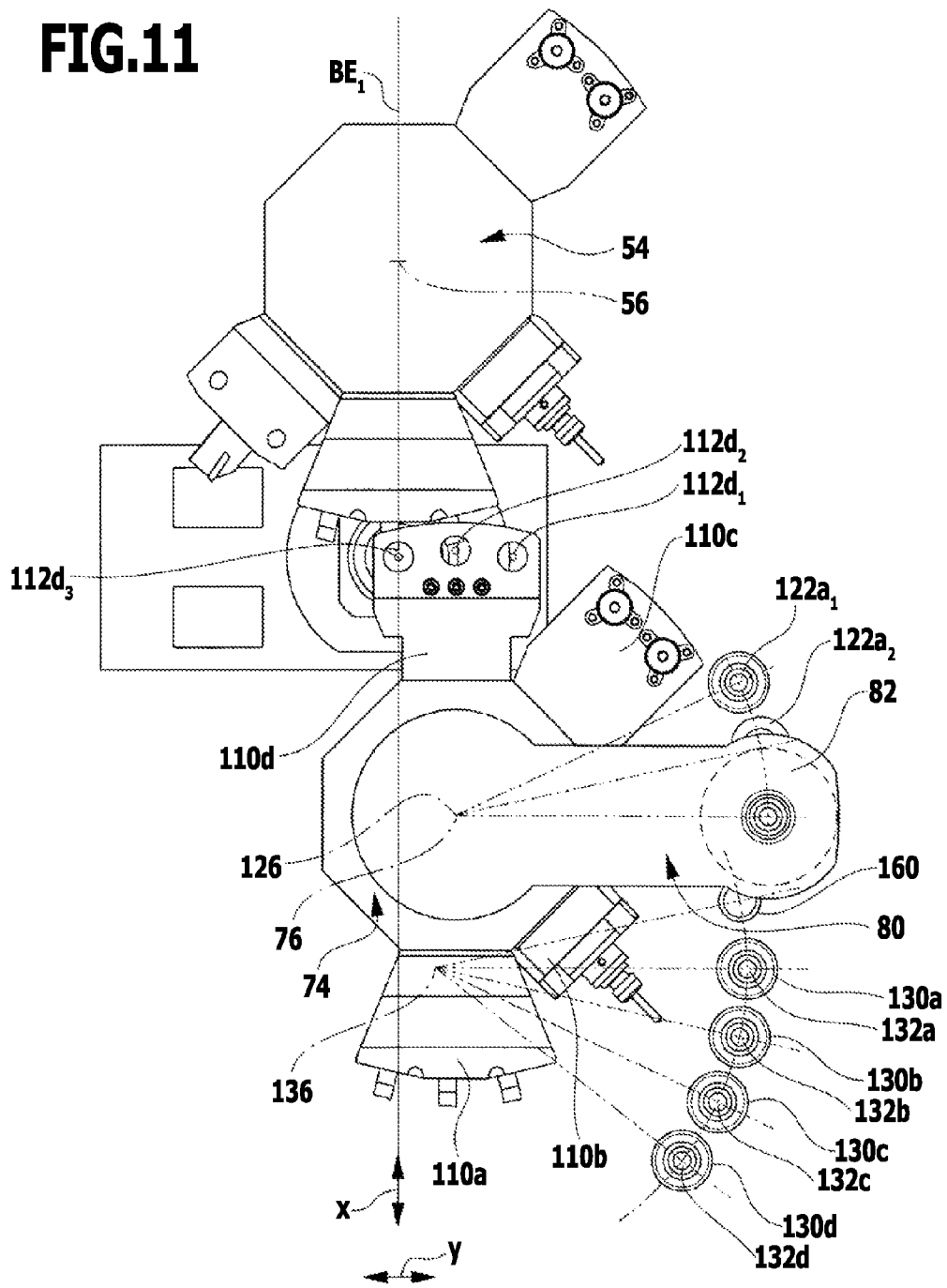
FIG. 11 shows an illustration similar to FIG. 9, wherein the second carrier is likewise in the simultaneous rear side machining position and an additional tool of the third machining unit is used for the workpiece held in the second spindle and an additional tool of the second machining unit is used for the workpiece held in the first spindle.
Figure 12:
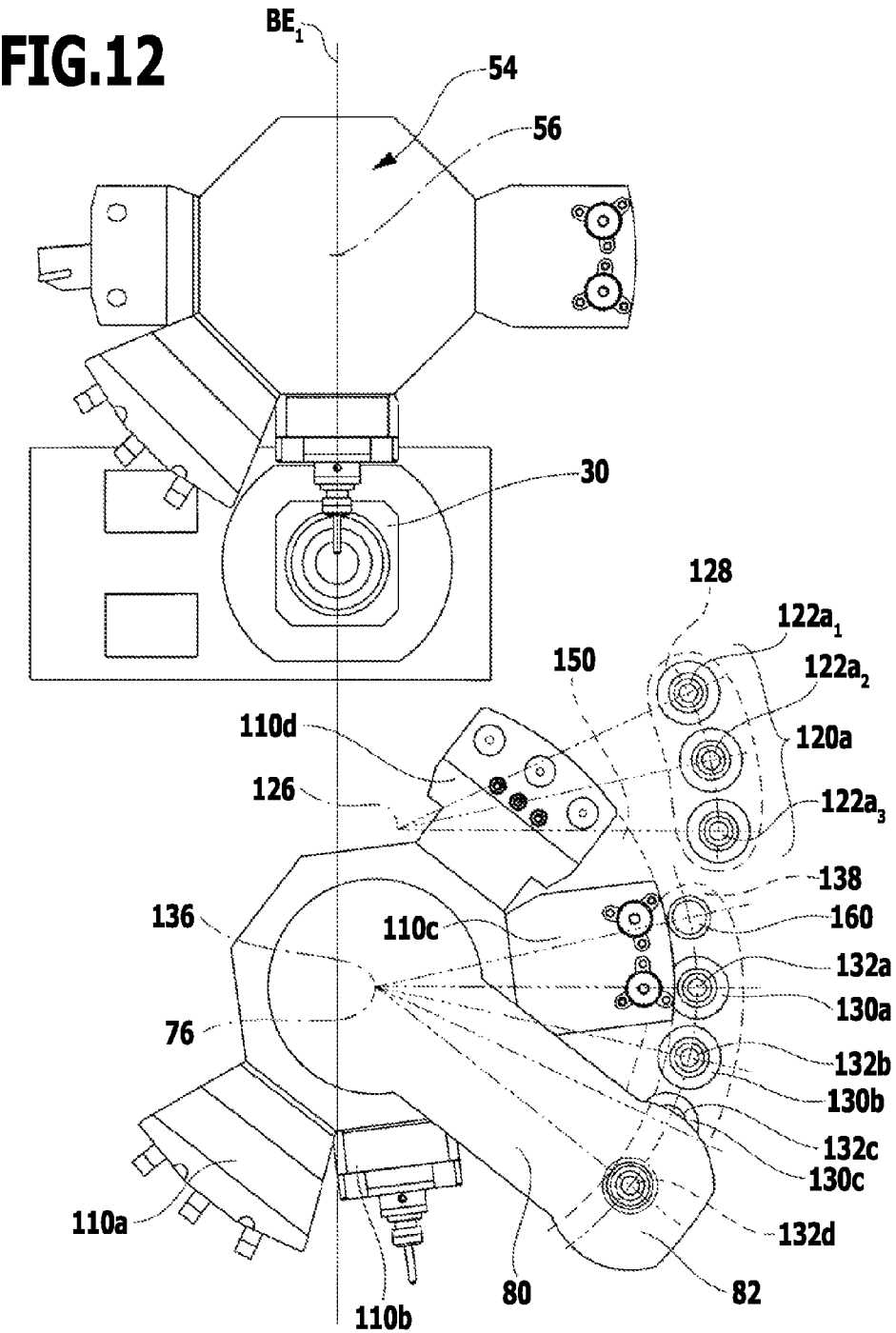
FIG. 12 shows an illustration similar to FIG. 5, wherein the second carrier is in a rear side machining position, in which only the rear side of the workpiece held in the second spindle is machined by additional third machining units but independently of machining of the workpiece in the first spindle.
Figure 13:
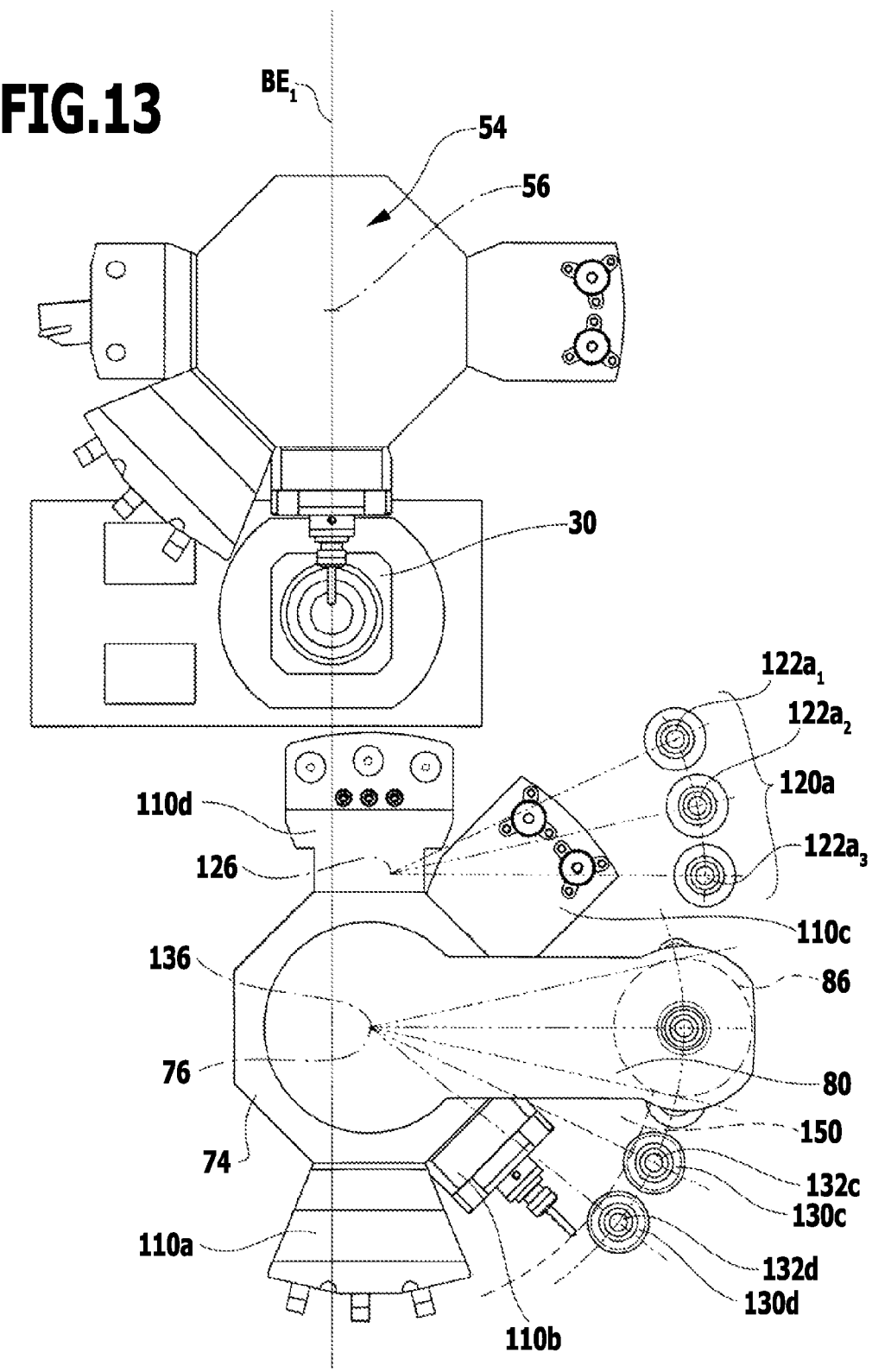
FIG. 13 shows an illustration similar to FIG. 12, wherein an additional third machining unit is used for the machining of the rear side of the workpiece and the second carrier is in the rear side machining position.

As illustrated in FIG. 10 and FIG. 11, the second turret head 74 can remain in the first line center point 126 with its second turret axis 74 in order to change over from the tool $122a_1$ to the tool $122a_2$ or the tool $122a_3$ during the machining and so it is not necessary to move the second turret head 74, in addition, in the direction of the X axis or the Y axis. Only a pivoting movement of the pivot arm 80 is required to move the counter spindle 86 from one of the third tools $122a_1$ to the next one of the third tools $122a_2$.

In the same way, the tools $112d_1$ to $112d_3$, which can be used in the case of the workpiece accommodated in the main spindle 26, can also be changed over as a result of the same pivoting movements through the same angles, wherein in the case of this changeover only a pivoting of the second turret head 74 about the second turret axis 76 likewise takes place.

As a result, it is possible in the case of the machine tool according to the invention in the simultaneous rear side machining position to machine the workpiece held in the counter spindle 86 on the rear side, namely with the tools $122a_1$ to $122a_3$ and, at the same time, to machine the workpiece W held in the main spindle 26 and guided by the guide bushing 30 for longitudinal turning on the front side WV of the workpiece by means of the tools $112d_1$, $112d_2$ and $112d_3$.

In order to achieve this, the tools $122a_1$ to $122a_3$ of the tool unit 120a are arranged at the same angular distances from one another, in relation to the first line center point 126, as the tools $122d_1$ to $122d_3$ which are all seated on the same tool unit 100d.

In this respect, it is particularly advantageous when the second turret head 74 can be rotated about the turret axis 76 not only in discrete angular steps but continuously through optional angles in order to be able to position the machining units exactly both in the front side machining position, the rear side synchronous machining position and the rear side machining position and/or to compensate for positioning errors and/or geometry errors.

In order to avoid any collision of the tools $122a_1$ to $122a_3$, which are arranged stationarily, with the tools 122 arranged on the second turret head 74 and the tool units 110 bearing these tools 112, the third tool unit 120a is arranged in a spatial area 128 which is located outside a spatial area of movement 140, in which the second tool units 110 move with the second tools 112 when the workpiece accommodated in the main spindle 26 and guided by the guide bushing 30 for longitudinal turning is machined on the front side WV of the workpiece with one of the second tools 112 in the front side machining position. The spatial area 140 also covers the positions of the second tool units 110 and second tools 112, in which the respective second tool 112 is changed, and, in addition, the locations of the second tool units 110 and second tools 112 which result for the takeover position of the counter spindle 86 according to FIG. 8.

In this respect, the spatial area 128, in which the third tool unit 120a is arranged, is, in particular, further removed from the first plane of machining BE1 than the maximum distance of the second tools 112 from the second turret axis 76.

Moreover, the spatial area 128 is located on a side of a plane of separation ET which faces away from the first turret unit 50, the plane of separation extending through the main spindle axis 28 and at right angles to the X axis of the second carrier 60.

In addition to the third tool unit 120a which allows a rear side machining of the workpiece accommodated in the counter spindle 86 at the same time as machining of a front side WV of a workpiece, which is accommodated in the main spindle 26 and guided by the guide bushing 30 for longitudinal turning, on account of the arrangement of the third tool unit 120a in the spatial area 128, additional third tool units 130a to 130d are provided, the tools 132a to 132d of which are arranged along a second line 134 which represents an arced segment relative to a second line center point 136 which is arranged at a greater distance from the plane of separation ET than the first line center point 126 but at a smaller distance from the first plane of machining BE1.

As a result of displacement of the second turret head 74 into a rear side machining position in such a manner that its turret axis 76 is located in the second line center point 136, it is possible to position the counter spindle 86 merely as a result of pivoting of the second turret head 74 such that the workpiece held in this counter spindle can be machined by the additional third tools 132a to 132d.

In order to avoid collisions, a spatial area 138, in which the additional third tools 132a to 132d are arranged, is located outside the spatial area of movement 140.

Furthermore, the spatial area 138 is arranged such that when the turret head is in the rear side machining position all the second tool units 110 and all the second tools 112 can move free from collision in relation to the guide bushing 30 for longitudinal turning and the workpiece held in the main spindle 26 and guided by the guide bushing 30 for longitudinal turning.

For this reason, the distance of the spatial area 138 from the plane of separation ET is greater than the distance of the spatial area 128 from it.

In the first embodiment, the spatial areas 128 and 138 are preferably arranged on a side of the plane of machining BE1 which faces the front side 18 of the machine frame 10, via which simple access to the third tool units 120 and the additional third tools 130 is possible in order to mount and adjust them.

Since, in addition, the tool units 130a to 130d and the tools 132a to 132d extend over an angular area which is greater than an angular area provided for one of the second tool units 110, it is provided for the purpose of achieving freedom from collisions between the additional third tools 132a to 132d and the second tools 112 as well as the second tool units 110 for the counter spindle 86 to keep the workpiece, which is provided for the rear side machining, with its rear side outside a tool space 150 which extends around the second turret axis 76 as an annular space radially adjacent to the second turret head 74 when the turret head 74 is in the rear side machining position and which, in addition, is predetermined by the greatest radial distance of the second tool units 110 or second tools 112 from the second turret axis 76 as well as the greatest axial distance of the second tool units 110 and the second tools 112 from a central plane ME of the receptacles 78 on the second turret head 74.

Figure 14:
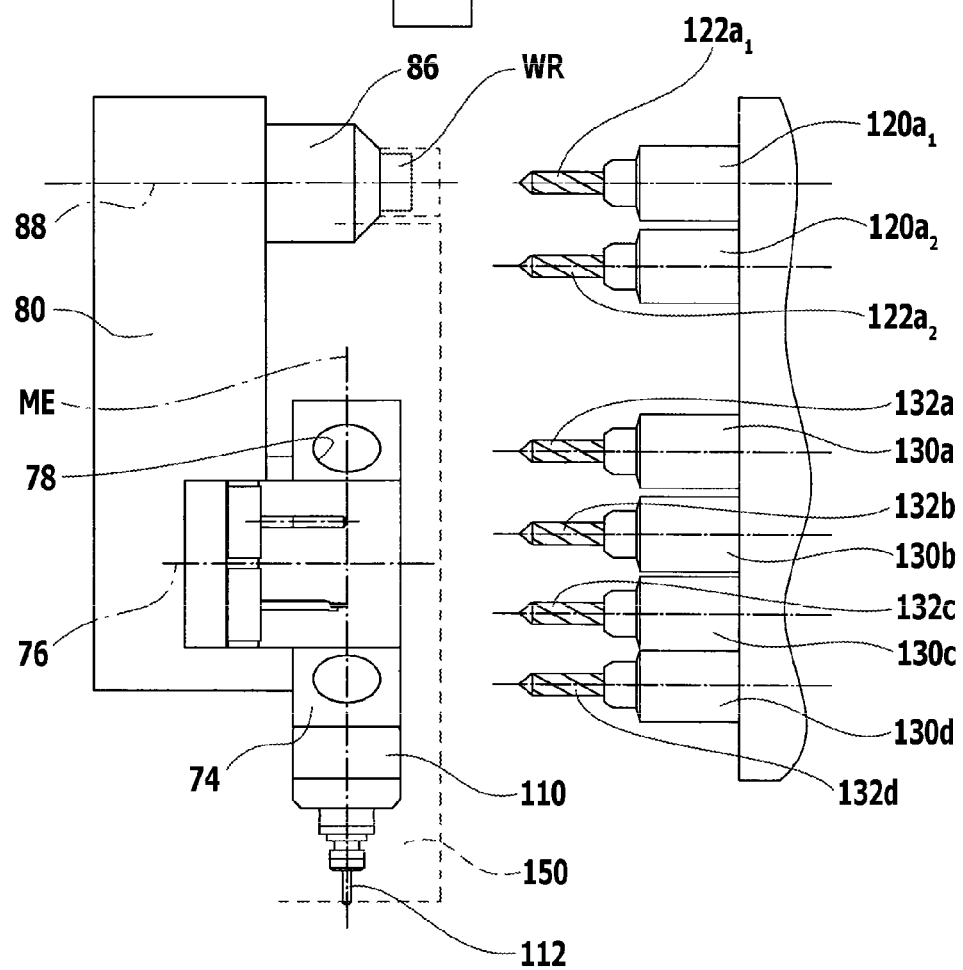
FIG. 14 shows a view in the direction of arrow D in FIG. 4.

In the first embodiment, as illustrated in FIG. 14 in a side view, the tool rear side WR of the workpiece held in the counter spindle 86 and intended for the rear side machining is located radially outside the tool space 150 with respect to the second turret axis 76 and so collisions between the second tool units 110 and the second tools 112 with the third tools 132a to 132d of the third tool units 120 can already be avoided on account of this arrangement.

Figure 15:
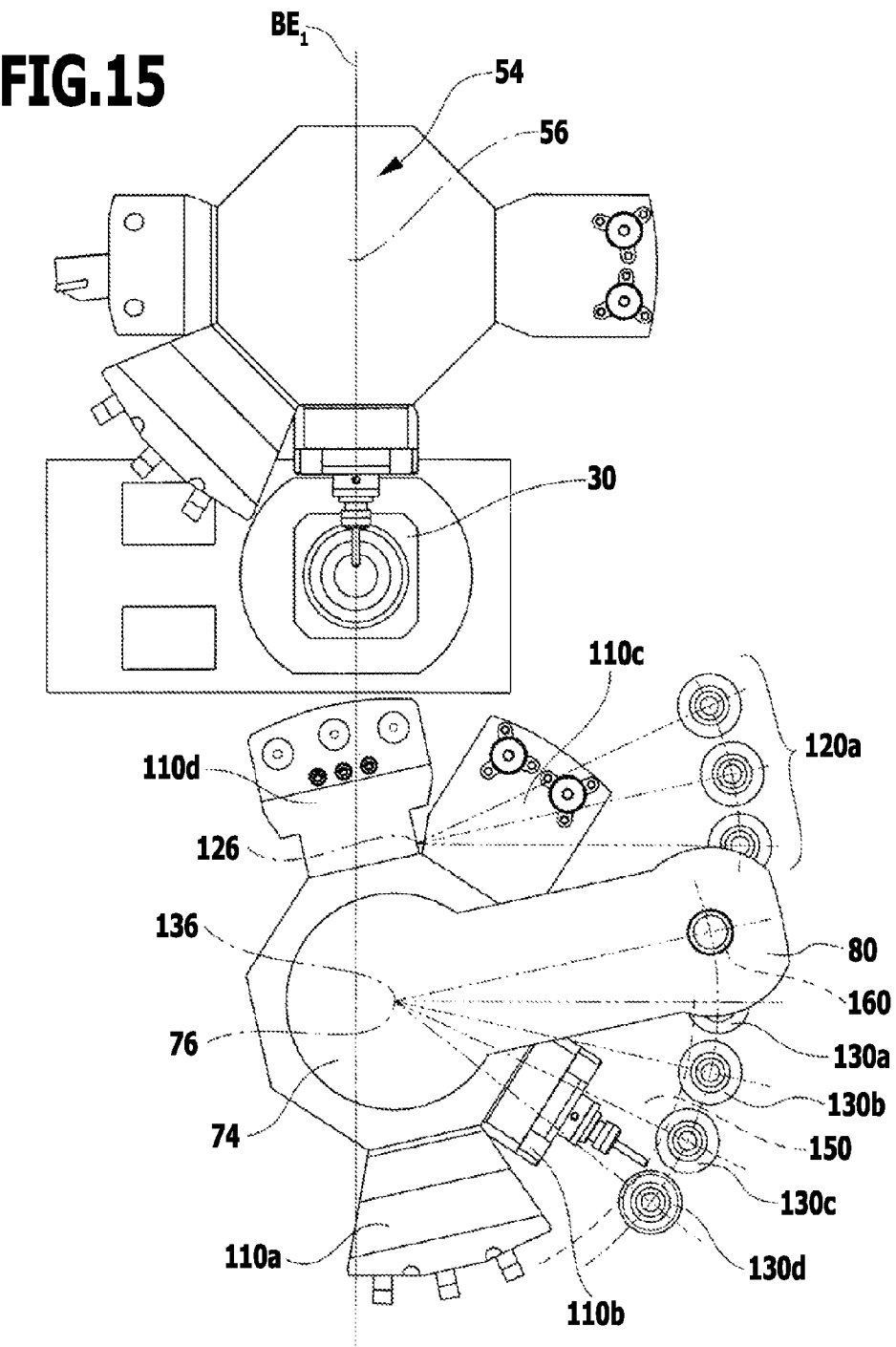
FIG. 15 shows an illustration similar to FIG. 5, wherein the second carrier is in a rear side machining position but is transferring the workpiece already machined on its rear side to a workpiece discharge device.

In order to remove the workpiece from the counter spindle 86, a workpiece discharge device 160 is provided, in addition, which is also expediently arranged along the second line 134 and within the spatial area 138 so that following machining of the rear side WR of the workpiece W with the tools 132 the workpiece discharge device 160 can be reached (FIG. 15) by way of an additional pivoting movement of the turret head 74 about the turret axis 76 without any movement being required in the second X direction or the second Y direction.

Figure 16:
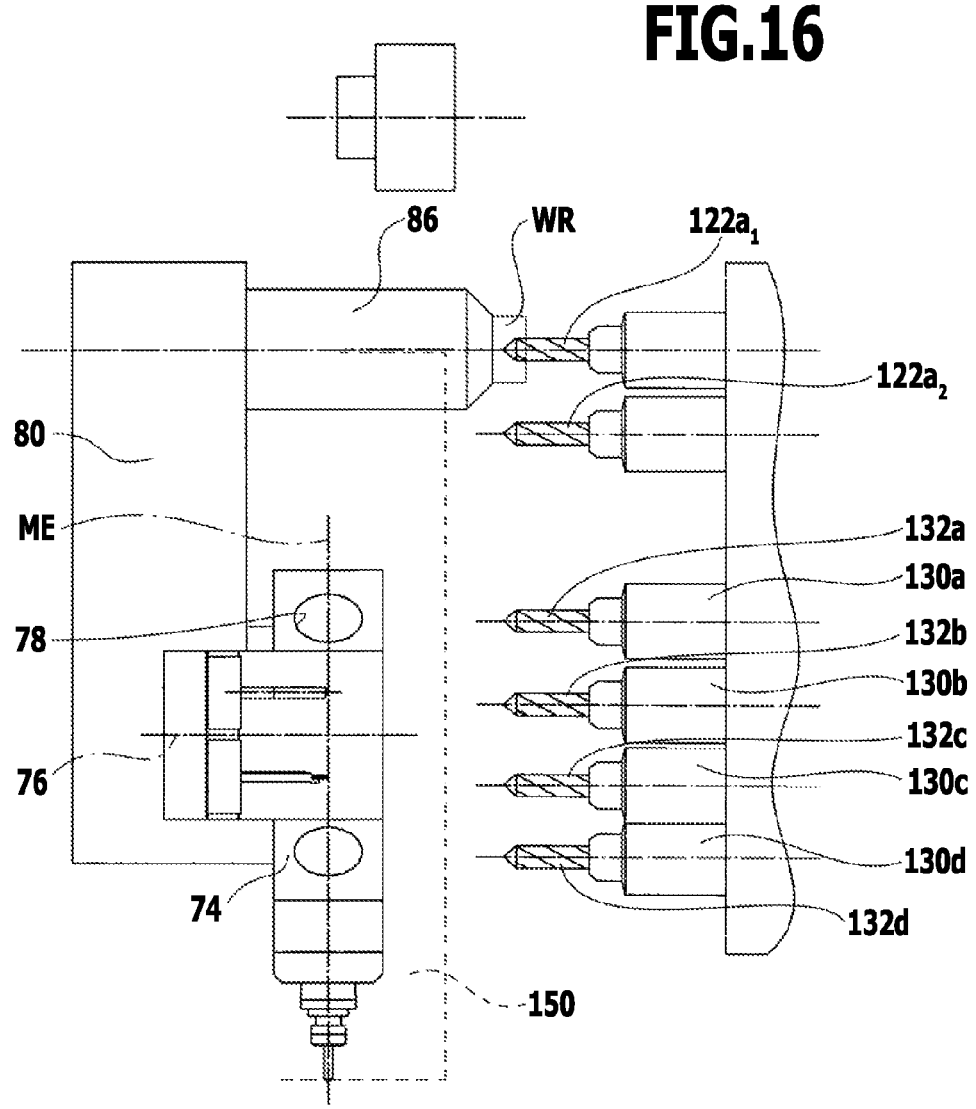
FIG. 16 shows an illustration similar to FIG. 14 of a second embodiment of a machine tool according to the invention.

Alternatively thereto, it is provided in a second embodiment, illustrated in FIG. 16, which represents a variation of the first embodiment, for the rear side WR of the workpiece accommodated in the counter spindle 86 and intended for machining to be positioned outside the tool space 150 in that it is at a greater distance in axial direction from the central plane ME than the extension of the tool space 150 in this direction and so, as a result, collisions between the second tool units 110 and second tools 112 extending in the tool space 150 with the third tools 132a to 132d can likewise not occur.

Figure 17:
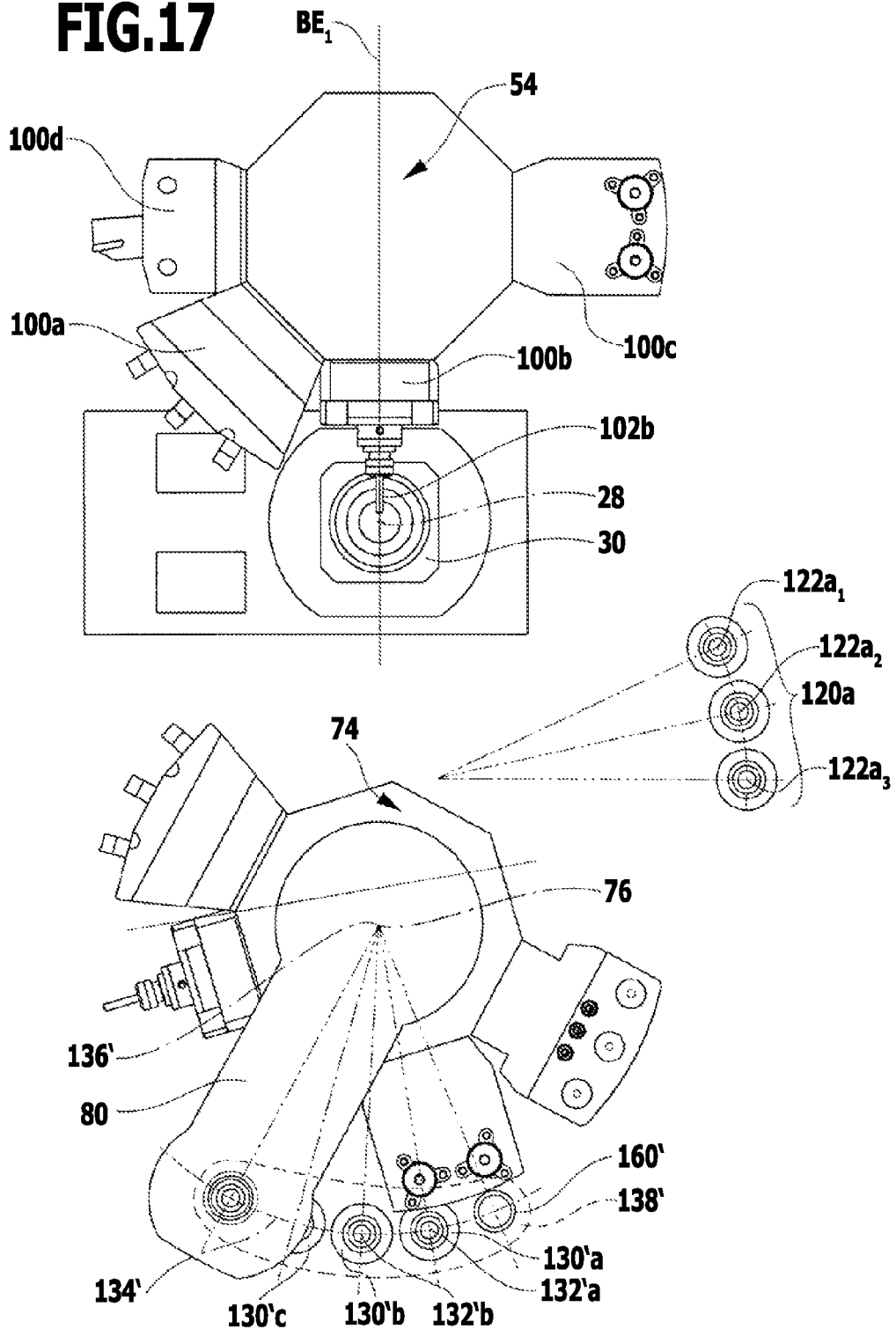
FIG. 17 shows an illustration similar to FIG. 12 of a third embodiment of a machine tool according to the invention.

In a third embodiment, illustrated in FIG. 17, which is a second variation of the first embodiment, the spatial area 138 is arranged on a side of the second turret head 74 located opposite the main spindle axis 28 so that, in this case, the second turret axis 76 and also the second center point 136' of the second line 134' can be positioned such that they are located on the plane of machining BE1 and so no displacement of the second turret axis 36' transversely to the first plane of machining BE1 in the direction of the Y axis is necessary.

In a fourth embodiment of a machine tool according to the invention, illustrated in FIGS. 18 to 21, the main spindle 26" can be moved in the direction of the Z axis in the same way as in the preceding embodiments.

In contrast to the preceding embodiments, the first carrier 40" is provided with a linear tool carrier 170 which can be moved relative to the machine frame 10 at least in the direction of the first X axis as well as the first Y axis, wherein several first tool units 100" with several first tools 102" are arranged on the linear tool carrier 170 along a row direction 162 and the row direction 172 extends parallel to the Y axis so that as a result of displacement of the linear tool carrier 170 along the Y axis a changeover between different first tools 102" is possible in order to be able to use them individually on the workpiece W.

In the same way, the second carrier 60" is provided with a second linear unit 180 which can likewise be displaced in the direction of the X axis, the Y axis and the Z axis, wherein second tool units 110" with second tools 112" are likewise arranged on the second linear unit 180 along a row direction 182, wherein the row direction 182 likewise extends parallel to the Y axis of the second carrier 60" so that in a front side machining position of the linear unit 180 different second tools 112" can be used for the machining of the front side WV of the workpiece W held in the main spindle 26" as a result of displacement of the linear unit 180 in the direction of the Y axis.

Figure 18:
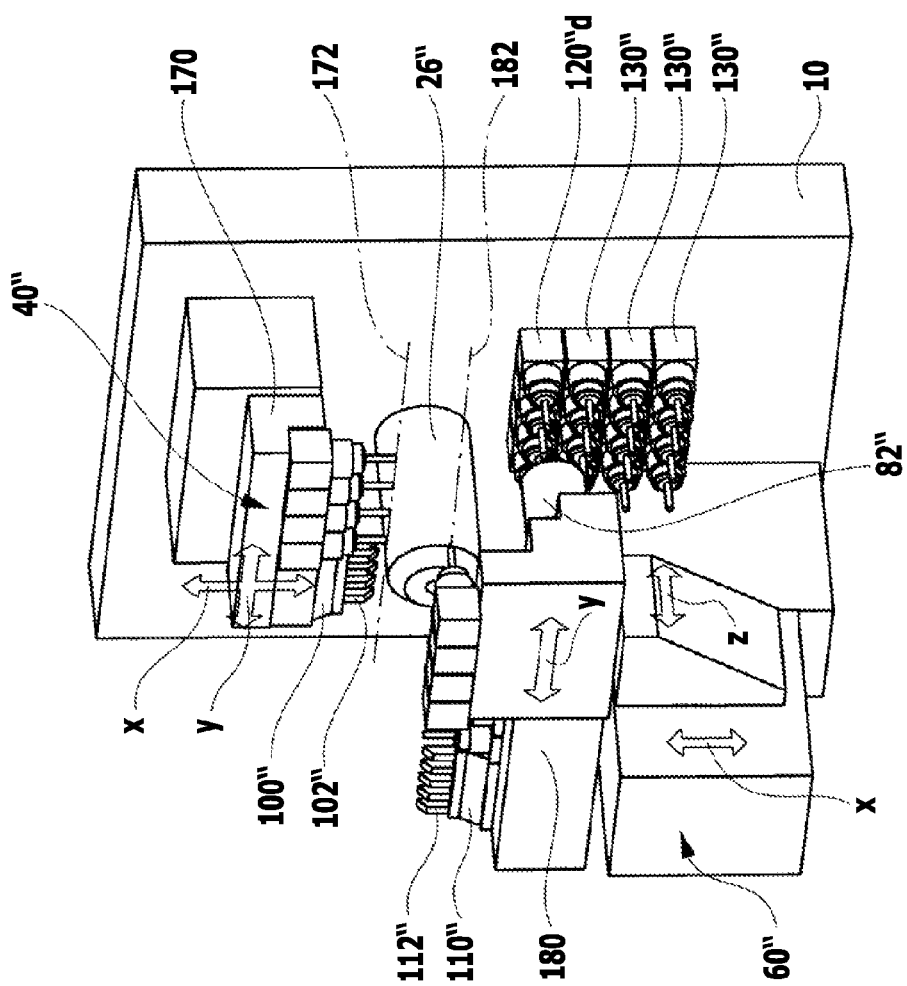
FIG. 18 shows a schematic illustration similar to FIG. 1 of a fourth embodiment of a machine tool according to the invention.
Figure 19:
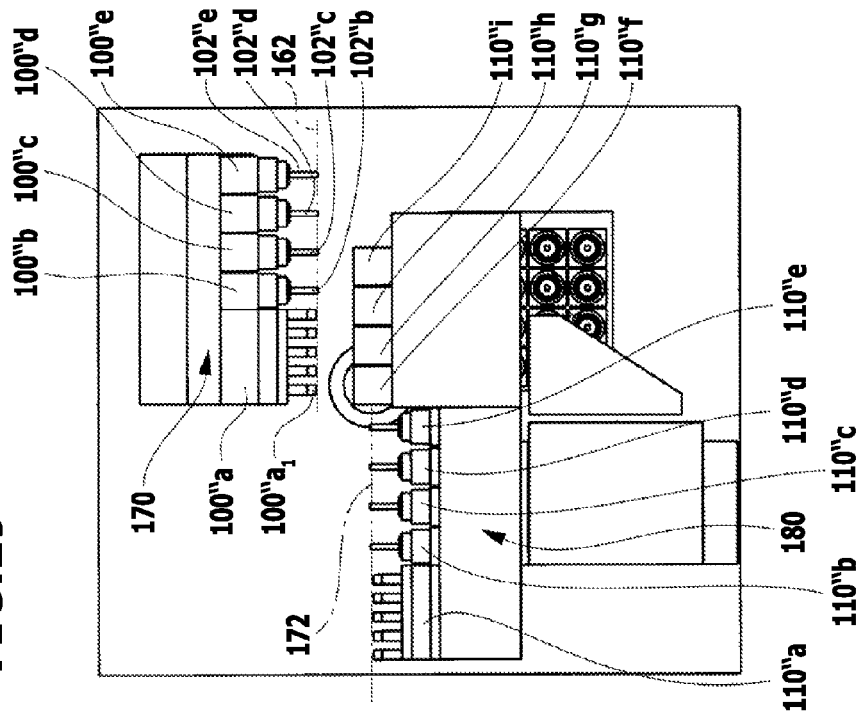
FIG. 19 shows an illustration similar to FIG. 2 of the second embodiment of the machine tool according to the invention.
Figure 20:
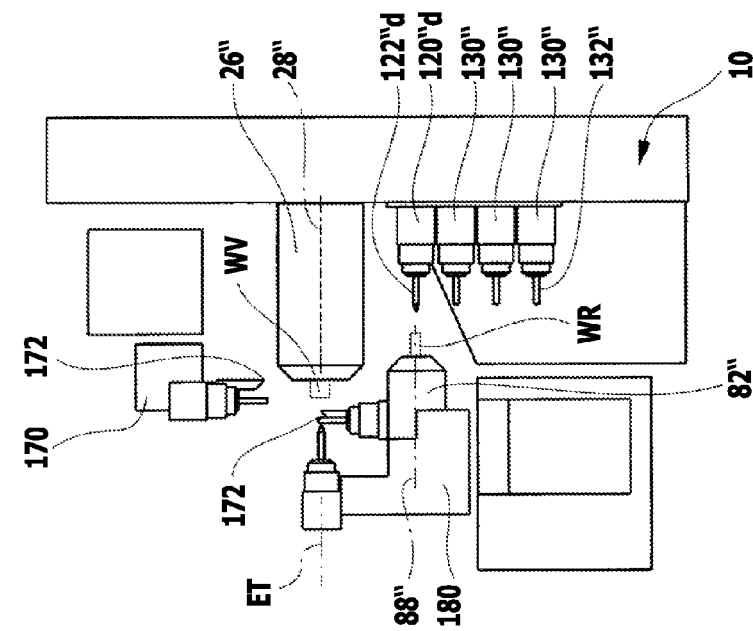
FIG. 20 shows an illustration similar to FIG. 3 of the fourth embodiment of the machine tool according to the invention and FIG. 21 shows a schematic illustration similar to FIG. 4 of the fourth embodiment of the machine tool according to the invention.
Figure 21:
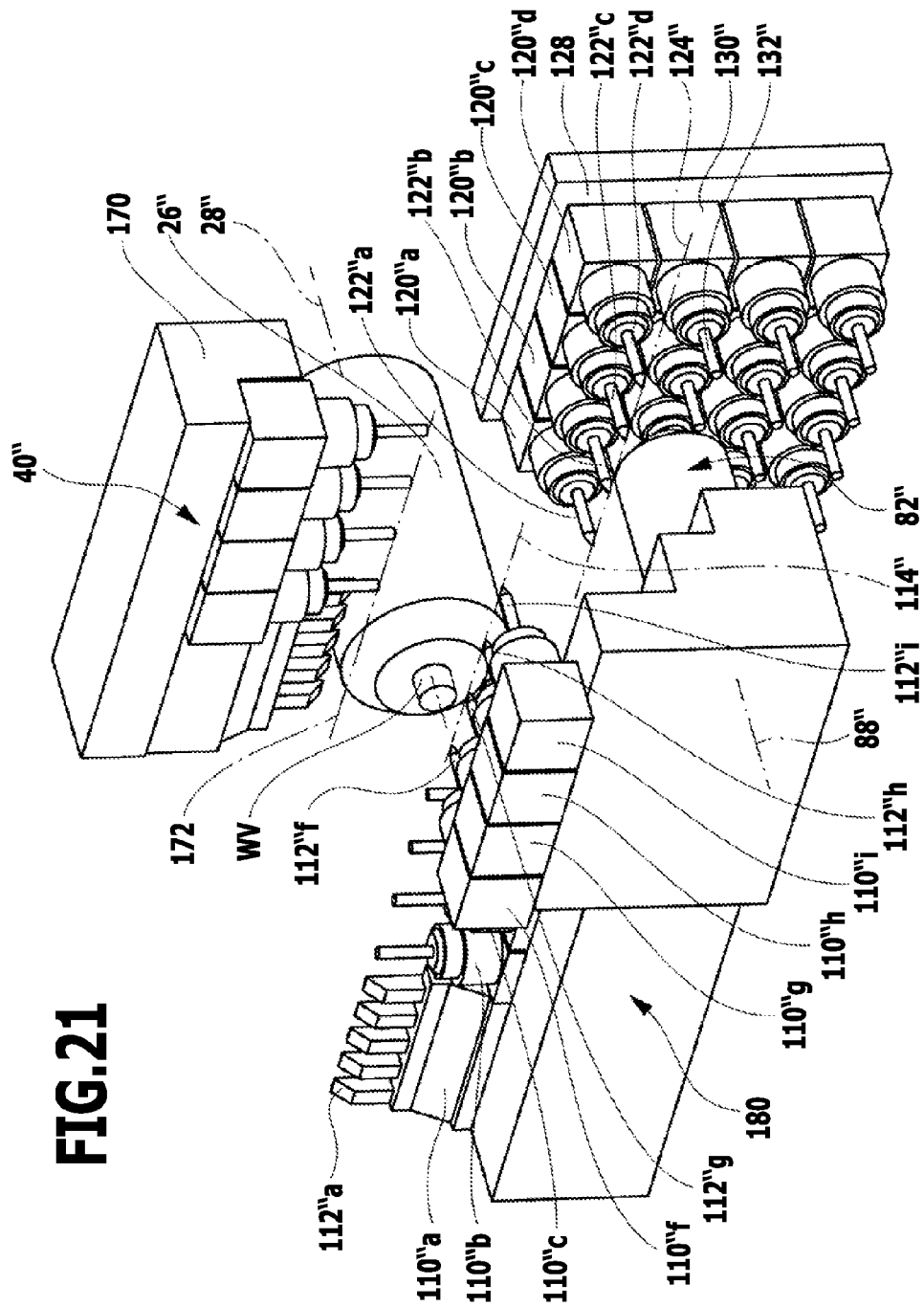

In addition, the counter spindle unit 82" is arranged on the second linear unit 180, as illustrated in FIGS. 18 and 19, and this can, therefore, be moved in the same way as the linear unit 180.

The counter spindle unit 82" is preferably aligned such that a counter spindle axis 88" extends parallel to the Z direction and also, in particular, parallel to the main spindle axis 28 in the same way as in the preceding embodiments and so the counter spindle unit 82" can also be moved in the direction of the second X axis, the second Y axis and the second Z axis as a result of movement of the linear unit 180.

In this respect, the counter spindle unit 82" is arranged, in particular, on a side of the row direction 182 facing away from the first carrier 40" and so the counter spindle axis 88" extends at a distance from the row direction 182.

Furthermore, third tool units 120" are arranged on the machine frame 10, for example, the tool units 120"a, 120"b, 120"c, 120"d, the tools 122"a, 122"b, 122"c and 122"d of which are arranged along a line 124" which extends parallel to the Y axis.

The tools 122"a to 122"d of the tool units 120"a to 120"d are arranged at the same distances from one another in the same manner as the tools 112"d, 112"e, 112"f and 112"g and, in addition, the tool units 120"a to 120"d are arranged in a spatial area 128 which is located such that the line 124" extends at the same distance from the main spindle axis 28 as the one line 114", along which the tools 112"d to 112"g are arranged, and so in the simultaneous rear side machining position of the linear unit 180 it is possible to use the tool 112"g on the workpiece W held in the main spindle 26" when the tool 122"a can be used at the same time for the rear side machining of the workpiece held in the counter spindle 86.

In the same way, the remaining tools 122"b to 122"d as well as 112"f to 112"d may also be used at the same time.

In addition to the third tool units 120"a to 120"d, additional third tool units 130" with fourth tools 132" are provided and these are arranged on a side of the third tool units 120"a to 120"d facing away from the first carrier 40" and can, therefore, be used for the machining of the workpiece held in the counter spindle 86" on the rear side thereof when the second linear unit 180 is in a rear side machining position and, in this respect, displaced away from the main spindle axis 28 to such an extent in the direction of the second X axis that none of the first tools 112" can be used on the front side WV of the workpiece W accommodated in the main spindle 26" and so only a rear side machining of the workpiece held in the counter spindle 88" can exclusively be carried out with the additional third tool units 130" and the corresponding tools 132".

As for the rest, the second embodiment functions in the same way as the first embodiment and so reference can be made to the first embodiment concerning details going beyond the preceding description of the construction and functioning of the second embodiment.

The invention claimed is:

1. Machine tool comprising
a machine frame,
a first spindle arranged on the machine frame for accommodating a workpiece,
a first carrier for first machining units arranged on the machine frame, said carrier being movable relative to the machine frame in the direction of a first X axis transverse to a first spindle axis of rotation of the first spindle, wherein the first spindle and the first carrier are movable relative to one another in the direction of a Z axis parallel to the first spindle axis,
a second carrier for second machining units arranged on the machine frame, said second carrier being movable relative to the machine frame at least in the direction of a second X axis transverse to the first spindle axis and, in addition, varying second machining units being movable with said second carrier into or out of a functional position associated with the workpiece in the first spindle in a further transverse direction extending transversely to the second X axis and transversely to the Z axis,
the machine tool also comprising an additional carrier for additional machining units arranged on the machine frame,
the second carrier bearing a second spindle,
wherein as a result of movement of the second carrier, the second spindle is movable in the direction of the Z axis and the further transverse direction between a workpiece takeover position aligned with the first spindle and at least one workpiece machining position, and
the additional machining units being arranged in a spatial area where machining of an exposed side of the workpiece held in the second spindle is adapted to be carried out with said second spindle located in the at least one workpiece machining position.

2. Machine tool as defined in claim 1, wherein the spatial area for the additional machining units is located on a side of a geometric plane located opposite a side of the plane where the first carrier is located, said plane extending through the first spindle axis and transversely to the second X axis.

3. Machine tool as defined in claim 2, wherein the spatial area is arranged at a distance from the plane.

4. Machine tool as defined in claim 1, wherein the spatial area is arranged on one side of a first plane of machining extending through the first spindle axis as well as parallel to the second X axis.

5. Machine tool as defined in claim 4, wherein the spatial area is arranged on a side of the first plane of machining adjacent to a front side of the machine tool.

6. Machine tool as defined in claim 1, wherein the spatial area is arranged on a side of the second carrier not adjacent to a side of the second carrier where the first spindle axis is located.

7. Machine tool as defined in claim 1, wherein the spatial area is arranged on a side of the second carrier.

8. Machine tool as defined in claim 1, wherein the additional machining units are arranged in a defined pattern.

9. Machine tool as defined in claim 8, wherein the additional machining units are arranged along at least one line.

10. Machine tool as defined in claim 9, wherein the at least one line is curved.

11. Machine tool as defined in claim 10, wherein the at least one line is curved in an arc shape around a center point.

12. Machine tool as defined in claim 11, wherein the center point of the at least one line curved in an arc shape is arranged at a distance from a first plane of machining extending through the first spindle axis as well as parallel to the second X axis.

13. Machine tool as defined in claim 10, wherein the at least one line extends over a greater distance in the direction of the second X axis than in the direction of the further transverse direction.

14. Machine tool as defined in claim 1, wherein the additional machining units are arranged outside a spatial area of movement of machining units arranged on the second carrier and designed as second tool units when the second carrier is in a functional position.

15. Machine tool as defined in claim 1, wherein the workpiece accommodated in the second spindle projects beyond it and is arranged outside a tool space associated with the second carrier.

16. Machine tool as defined in claim 15, wherein the workpiece accommodated in the second spindle is arranged outside the tool space associated with the second carrier, and is outside from the tool space with its side to be machined thereof in a direction transverse to the Z axis.

17. Machine tool as defined in claim 15, wherein the workpiece accommodated in the second spindle is arranged with a side thereof to be machined located outside the tool space, the side to be machined being spaced from the tool space in the direction of the Z axis.

18. Machine tool as defined in claim 1, wherein the second spindle is arranged relative to the second tool units such that, during machining of the workpiece accommodated in the second spindle, the second tool units are movable in a collision free manner relative to the additional tool units.

19. Machine tool as defined in claim 1, wherein the spatial area for the additional machining units comprises a spatial area where only machining units for the simultaneous machining of a workpiece held in the second spindle at the same time that a second machining unit of the second carrier performs machining on a workpiece held in the first spindle are provided.

20. Machine tool as defined in claim 1, wherein the spatial area accommodating the additional machining units is arranged such that, during machining of the workpiece accommodated in the second spindle with these additional machining units, second machining units arranged on the second carrier are adapted to be used on the workpiece held in the first spindle.

21. Machine tool as defined in claim 1, wherein the spatial area for the additional machining units comprises a spatial area where only machining units for the exposed side machining are provided.

22. Machine tool as defined in claim 1, wherein the spatial area accommodating the additional machining units for the exposed side machining are arranged such that during machining of the workpiece accommodated in the second spindle with the additional machining units in this spatial area, the second machining units of the second carrier are movable in a collision free manner relative to the workpiece in the first spindle.

23. Machine tool as defined in claim 1, wherein at least one of the second machining units arranged on the second carrier is provided for the machining of the workpiece arranged in the first spindle at the same time that the workpiece arranged in the second spindle is machined by the additional machining units.

24. Machine tool as defined in claim 23, wherein the at least one second machining unit for machining the workpiece arranged in the first spindle is arranged at a distance relative to the second spindle.

25. Machine tool as defined in claim 1, wherein the second carrier comprises a turret unit, the second spindle being arranged on a turret head of said turret unit.

26. Machine tool as defined in claim 25, wherein the second spindle is held on the turret head by means of a pivot arm.

27. Machine tool as defined in claim 26, wherein the turret head is connected to the pivot arm so as to be non-rotatable with respect to the pivot arm.

28. Machine tool as defined in claim 25, wherein a second spindle axis of rotation of the second spindle is arranged at a radial distance from a turret axis of rotation of the turret head greater than a maximum radial extension of tools of the second machining units with respect to the turret axis.

29. Machine tool as defined in claim 25, wherein one of the second machining units is for the machining of the workpiece arranged in the first spindle and is arranged on the second carrier at an angular distance about a turret axis of rotation of the turret head from the second spindle of more than 60°.

30. Machine tool as defined in claim 29, wherein the angular distance is more than 70°.

31. Machine tool as defined in claim 29, wherein the angular distance is less than 120°.

32. Machine tool as defined in claim 31, wherein the angular distance is less than 110°.

33. Machine tool as defined in claim 25, wherein the spatial area is at an angular distance from the first spindle axis about a turret rotation axis of the turret unit during machining of the workpiece in the second spindle by one of the additional machining units simultaneous with machining of the workpiece in the first spindle with one of the second machining units.

34. Machine tool as defined in claim 1, wherein the second spindle is arranged at a distance from a row direction of a row of the second machining units, cutting edges of the second machining units being located along said row direction.

35. Machine tool as defined in claim 34, wherein a distance of the spatial area for the additional machining units from the first spindle axis corresponds approximately to a distance of the second spindle from the row direction.

* * * * *